(12) United States Patent
Xiong et al.

(10) Patent No.: US 10,257,768 B2
(45) Date of Patent: Apr. 9, 2019

(54) PACKET SENDING METHOD AND APPARATUS

(71) Applicant: HUAWEI TECHNOLOGIES CO., LTD., Shenzhen (CN)

(72) Inventors: Zhiwei Xiong, Shenzhen (CN); Hui Ni, Beijing (CN); Hui Cai, Shenzhen (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 157 days.

(21) Appl. No.: 15/367,971

(22) Filed: Dec. 2, 2016

(65) Prior Publication Data
US 2017/0086126 A1 Mar. 23, 2017

Related U.S. Application Data

(63) Continuation of application No. PCT/CN2014/079224, filed on Jun. 5, 2014.

(51) Int. Cl.
*H04L 12/721* (2013.01)
*H04W 40/24* (2009.01)
*H04W 76/12* (2018.01)
*H04W 8/08* (2009.01)
(Continued)

(52) U.S. Cl.
CPC .......... *H04W 40/248* (2013.01); *H04W 8/08* (2013.01); *H04W 8/24* (2013.01); *H04W 68/02* (2013.01); *H04W 76/12* (2018.02)

(58) Field of Classification Search
None
See application file for complete search history.

(56) References Cited

U.S. PATENT DOCUMENTS

2007/0082683 A1* 4/2007 Na ................... H04W 68/00
                                                       455/456.1
2012/0099561 A1   4/2012 Zhao et al.
2013/0301611 A1* 11/2013 Baghel ............... H04W 76/12
                                                       370/331

FOREIGN PATENT DOCUMENTS

CN      101459928 A       6/2009
CN      101931937        12/2010
CN      101938787 A       1/2011
(Continued)

OTHER PUBLICATIONS

International Search Report dated Mar. 6, 2015 in corresponding International Application No. PCT/CN2014/079224.
(Continued)

*Primary Examiner* — Ayanah S George
(74) *Attorney, Agent, or Firm* — Staas & Halsey LLP

(57) ABSTRACT

The present application discloses a packet sending method and apparatus. The method includes: receiving a packet notification message sent by a first forwarding entity, where the first forwarding entity is a forwarding entity that receives a packet that is sent by a public data network PDN to a mobile terminal, and the packet notification message carries at least a terminal address of the mobile terminal; if the mobile terminal is in an idle state, paging the mobile terminal according to the terminal address of the mobile terminal, so that the mobile terminal sets up a connection to a base station eNodeB; and setting up a data channel between the eNodeB and the first forwarding entity, to connect the mobile terminal and the first forwarding entity, so that the first forwarding entity sends the packet to the mobile terminal by using the data channel and the connection.

16 Claims, 7 Drawing Sheets

(51) Int. Cl.
*H04W 8/24* (2009.01)
*H04W 68/02* (2009.01)

(56) References Cited

FOREIGN PATENT DOCUMENTS

| CN | 102238634 | | 11/2011 | | |
|---|---|---|---|---|---|
| CN | 102740283 | | 10/2012 | | |
| EP | 2 600 668 | | 6/2013 | | |
| EP | 2600668 | A1 * | 6/2013 | .......... | H04W 68/005 |
| WO | 2010/062095 | | 6/2010 | | |
| WO | 2011/026663 | | 3/2011 | | |

OTHER PUBLICATIONS

International Search Report dated Mar. 6, 2015 in corresponding International Application No. PCT/CN2014/079224, 4 pages.
Extended European Search Report dated Jun. 1, 2017 in corresponding European Patent Application No. 14893778.2, 22 pages.
Office Action, dated Jan. 30, 2019, in Chinese Application No. 201480074403.9 (9 pp.).

* cited by examiner

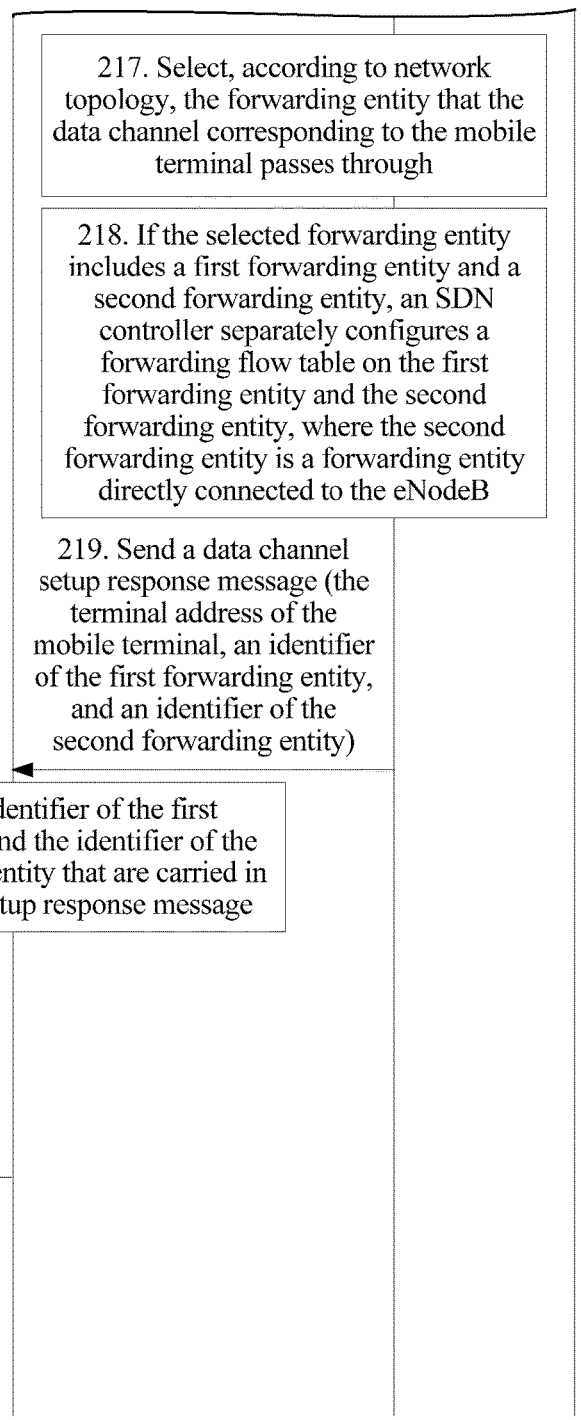
FIG. 2-3B

PACKET SENDING METHOD AND APPARATUS

CROSS-REFERENCE TO RELATED APPLICATIONS

This application is a continuation of International Application No. PCT/CN2014/079224, filed on Jun. 5, 2014, the disclosure of which is hereby incorporated by reference in its entirety.

TECHNICAL FIELD

The present application relates to the field of mobile communications, and in particular, to a packet sending method and apparatus.

BACKGROUND

In a mobile communications network, an idle service is one of basic mobile services. If the idle service is implemented in the mobile communications network, if a mobile terminal is idle, a radio link is faulty, or a base station is faulty, an air interface connection between the mobile terminal and the base station is released, and the mobile terminal enters an idle state. When a core network needs to send a packet to the mobile terminal, the mobile terminal then sets up a connection to the core network, and enters a non-idle state to receive the packet from the core network.

An implementation process of the idle service includes an S1-Release procedure, a Service Request procedure, and a Paging procedure. If the mobile terminal is idle, the radio link is faulty, or the base station is faulty, the mobile terminal releases the air interface connection to the base station by using the S1-Release procedure, so that the mobile terminal enters the idle state; and when the mobile terminal enters the idle state, a network element of the core network still retains a tunnel that the mobile terminal sets up when accessing the network. When the network element of the core network receives a packet that needs to be sent to the mobile terminal, the network element initiates the Paging procedure to page the mobile terminal, that is, the network element triggers, by using the tunnel corresponding to the mobile terminal, the base station to page the mobile terminal. After the mobile terminal is paged, the mobile terminal sets up a connection to the network element by performing the Service Request procedure, and then the network element forwards the packet to the mobile terminal by using the connection.

In the mobile communications network, the network element can initiate the Paging procedure to page the mobile terminal; therefore, the network element has a control function. The network element can further receive the packet that needs to be sent to the mobile terminal, and forward the packet to the mobile terminal; therefore, the network element has a forwarding function. Because the network element has both the control function and the forwarding function, the network element has relatively high costs. During network coverage extension and area expansion, more network elements are added to the mobile communications network; however, the network elements have relatively high costs, which results in relatively high costs of network coverage extension and area expansion.

To reduce costs of network upgrade extension and expansion, at present, an SDN (software defined networking) network architecture is integrated into the mobile communications network. In the mobile communications network that integrates the SDN network architecture, the control function is implemented by a network controller, and the forwarding function is implemented by a forwarding entity, thereby implementing separation of the control function and the forwarding function. Because the forwarding entity has no control function but universality, costs of the forwarding entity are less than the costs of the foregoing network element. During network upgrading and expansion, only more forwarding entities need to be added, thereby reducing costs of network coverage extension.

In the mobile communications network that integrates the SDN network architecture, when the air interface connection between the mobile terminal and the base station is released and a network side has a packet to send to the mobile terminal, there is no mechanism to wake up the mobile terminal, so as to send the packet to the mobile terminal.

SUMMARY

In a mobile communications network that integrates an SDN network architecture, to wake up a mobile terminal in an idle state so as to send a packet to the mobile terminal in the idle state, the present application provides a packet sending method and apparatus. The technical solution is as follows:

According to a first aspect, a packet sending method is provided, where the method includes:

receiving a packet notification message sent by a first forwarding entity, where the first forwarding entity is a forwarding entity that receives a packet that is sent by a public data network PDN to a mobile terminal, and the packet notification message carries at least a terminal address of the mobile terminal;

if the mobile terminal is in an idle state, paging the mobile terminal according to the terminal address of the mobile terminal, so that the mobile terminal sets up a connection to a base station eNodeB; and setting up a data channel between the eNodeB and the first forwarding entity, to connect the mobile terminal and the first forwarding entity, so that the first forwarding entity sends the packet to the mobile terminal by using the data channel and the connection.

With reference to the first aspect, in a first possible implementation manner of the foregoing first aspect, the paging the mobile terminal according to the terminal address of the mobile terminal includes:

sending a data notification message to a mobile network controller EPCC, where the data notification message carries the terminal address of the mobile terminal, so that the EPCC pages the mobile terminal according to the terminal address of the mobile terminal.

With reference to the first aspect, in a second possible implementation manner of the foregoing first aspect, before the setting up a data channel between the eNodeB and the first forwarding entity, the method further includes:

receiving a data channel setup request message sent by the EPCC, where the data channel setup request message carries an identifier of the eNodeB and a tunnel identifier on the eNodeB side.

With reference to the first aspect, in a third possible implementation manner of the foregoing first aspect, the setting up a data channel between the eNodeB and the first forwarding entity includes:

selecting, according to network topology, a forwarding entity that the data channel between the eNodeB and the first forwarding entity passes through; and configuring a forwarding flow table on the selected forwarding entity according to a tunnel identifier on the eNodeB side, packet characteristic information, and a packet processing rule, so as to set up the data channel between the eNodeB and the first forwarding entity.

With reference to the third possible implementation manner of the first aspect, in a fourth possible implementation manner of the foregoing first aspect, the configuring a forwarding flow table on the selected forwarding entity according to a tunnel identifier on the eNodeB side, packet characteristic information, and a packet processing rule includes:

if the selected forwarding entity is the first forwarding entity, obtaining a tunnel identifier on the first forwarding entity side; and creating a forwarding flow table for the first forwarding entity, where the forwarding flow table includes the tunnel identifier on the eNodeB side, the tunnel identifier on the first forwarding entity side, the packet characteristic information, and the packet processing rule.

With reference to the fourth possible implementation manner of the first aspect, in a fifth possible implementation manner of the foregoing first aspect, after the creating a forwarding flow table for the first forwarding entity, the method further includes:

sending the forwarding flow table to the first forwarding entity, so that the first forwarding entity installs the forwarding flow table, to set up the data channel between the eNodeB and the first forwarding entity, where the data channel is a tunnel between the eNodeB and the first forwarding entity.

With reference to the third possible implementation manner of the first aspect, in a sixth possible implementation manner of the foregoing first aspect, the configuring a forwarding flow table on the selected forwarding entity according to a tunnel identifier on the eNodeB side, packet characteristic information, and a packet processing rule includes:

if the selected forwarding entity includes the first forwarding entity and a second forwarding entity directly connected to the eNodeB, obtaining a tunnel identifier of a first tunnel on the second forwarding entity side, a tunnel identifier of a second tunnel on the second forwarding entity side, and a tunnel identifier of the first tunnel on the first forwarding entity side, where the first tunnel is a tunnel between the first forwarding entity and the second forwarding entity, and the second tunnel is a tunnel between the eNodeB and the second forwarding entity;

creating a first forwarding flow table for the first forwarding entity, where the first forwarding flow table includes the tunnel identifier of the first tunnel on the first forwarding entity side, the tunnel identifier of the first tunnel on the second forwarding entity side, the packet characteristic information, and the packet processing rule; and creating a second forwarding flow table for the second forwarding entity, where the second forwarding flow table includes the tunnel identifier on the eNodeB side, the tunnel identifier of the second tunnel on the second forwarding entity side, the packet characteristic information, and the packet processing rule.

With reference to the sixth possible implementation manner of the first aspect, in a seventh possible implementation manner of the foregoing first aspect, after the creating a second forwarding flow table for the second forwarding entity, the method further includes:

sending the first forwarding flow table to the first forwarding entity, so that the first forwarding entity installs the first forwarding flow table; and sending the second forwarding flow table to the second forwarding entity, so that the second forwarding entity installs the second forwarding flow table, to set up the data channel between the eNodeB and the first forwarding entity, where the data channel includes the first tunnel and the second tunnel.

With reference to the sixth possible implementation manner of the first aspect, in an eighth possible implementation manner of the foregoing first aspect, the configuring a forwarding flow table on the selected forwarding entity according to a tunnel identifier on the eNodeB side, packet characteristic information, and a packet processing rule further includes:

if the selected forwarding entity further includes a third forwarding entity between the first forwarding entity and the second forwarding entity, creating a third forwarding flow table for the third forwarding entity, where the third forwarding flow table includes the tunnel identifier of the first tunnel on the first forwarding entity side, the tunnel identifier of the first tunnel on the second forwarding entity side, the packet characteristic information, and the packet processing rule.

With reference to the eighth possible implementation manner of the first aspect, in a ninth possible implementation manner of the foregoing first aspect, after the creating a third forwarding flow table for the third forwarding entity, the method further includes:

sending the third forwarding flow table to the third forwarding entity, so that the third forwarding entity installs the third forwarding flow table.

With reference to the first aspect, in a tenth possible implementation manner of the foregoing first aspect, after the configuring a forwarding flow table on the selected forwarding entity according to a tunnel identifier on the eNodeB side, packet characteristic information, and a packet processing rule, the method further includes:

storing, into a user bearer information table, the terminal address of the mobile terminal, a bearer state, an identifier of the selected forwarding entity, and the forwarding flow table created for the selected forwarding entity, where the bearer state is an active state.

With reference to the first aspect, in an eleventh possible implementation manner of the foregoing first aspect, before the receiving a packet notification message sent by a first forwarding entity, the method further includes:

receiving a release request message sent by an EPCC when the mobile terminal requests to enter the idle state, where the release request message carries a release indication and the terminal address of the mobile terminal.

With reference to the eleventh possible implementation manner of the first aspect, in a twelfth possible implementation manner of the foregoing first aspect, after the receiving a release request message sent by an EPCC when the mobile terminal requests to enter the idle state, the method further includes:

deleting, according to the release indication and the terminal address, a forwarding flow table corresponding to the mobile terminal on a forwarding entity that a data channel corresponding to the mobile terminal passes through, so that the mobile terminal enters the idle state.

With reference to the twelfth possible implementation manner of the first aspect, in a thirteenth possible implementation manner of the foregoing first aspect, the deleting, according to the release indication and the terminal address, a forwarding flow table corresponding to the mobile terminal on a forwarding entity that a data channel corresponding to the mobile terminal passes through includes:

obtaining, from a user bearer information table according to the terminal address of the mobile terminal, the forwarding entity that the data channel corresponding to the mobile terminal passes through and the forwarding flow table corresponding to the mobile terminal; and determining, from the obtained forwarding flow table, a forwarding flow table corresponding to the obtained forwarding entity, and obtaining an identifier of the determined forwarding flow table from the determined forwarding flow table.

With reference to the thirteenth possible implementation manner of the first aspect, in a fourteenth possible implementation manner of the foregoing first aspect, after the determining, from the obtained forwarding flow table, a forwarding flow table corresponding to the obtained forwarding entity, and obtaining an identifier of the determined forwarding flow table from the determined forwarding flow table, the method further includes:

sending a flow table update message to the obtained forwarding entity, where the flow table update message carries a delete instruction and the identifier of the forwarding flow table corresponding to the obtained forwarding entity, so that the forwarding entity deletes the forwarding flow table corresponding to the identifier.

With reference to the twelfth possible implementation manner of the first aspect, in a fifteenth possible implementation manner of the foregoing first aspect, after the deleting, according to the release indication and the terminal address, a forwarding flow table corresponding to the mobile terminal on a forwarding entity that a data channel corresponding to the mobile terminal passes through, the method further includes:

obtaining, from a user bearer information table according to the terminal address of the mobile terminal, a record corresponding to the mobile terminal; and deleting a forwarding flow table stored in the record, and setting a bearer state in the record to the idle state.

According to a second aspect, a packet sending method is provided, where the method includes:

receiving, by a forwarding entity, a packet that is sent by a PDN to a mobile terminal, and searching a stored forwarding flow table according to packet characteristic information;

if no forwarding flow table including the packet characteristic information is found, sending a packet notification message to a software defined networking SDN controller, where the packet notification message carries at least a terminal address of the mobile terminal, so that the SDN controller connects a channel between the forwarding entity and the mobile terminal, where the channel includes a connection between the mobile terminal and an eNodeB, and a data channel between the forwarding entity and the eNodeB;

receiving a forwarding flow table sent by the SDN controller, where the forwarding flow table includes at least the packet characteristic information, a packet processing rule, and a tunnel identifier of a tunnel included by the data channel; and sending the packet to the mobile terminal according to the forwarding flow table and by using the channel.

With reference to the second aspect, in a first possible implementation manner of the foregoing second aspect, before the receiving, by a forwarding entity, a packet that is sent by a PDN to a mobile terminal, and searching a stored forwarding flow table according to packet characteristic information, the method further includes:

receiving, by the forwarding entity, a flow table update message sent by the SDN controller, where the flow table update message carries a delete instruction and an identifier of a forwarding flow table corresponding to the mobile terminal.

With reference to the first possible implementation manner of the second aspect, in a second possible implementation manner of the foregoing second aspect, after the receiving, by the forwarding entity, a flow table update message sent by the SDN controller, the method further includes:

deleting the forwarding flow table corresponding to the identifier according to the delete instruction.

According to a third aspect, a packet sending apparatus is provided, where the apparatus includes:

a receiving module, configured to receive a packet notification message sent by a first forwarding entity, where the first forwarding entity is a forwarding entity that receives a packet that is sent by a public data network PDN to a mobile terminal, and the packet notification message carries at least a terminal address of the mobile terminal;

a paging module, configured to: if the mobile terminal is in an idle state, page the mobile terminal according to the terminal address of the mobile terminal, so that the mobile terminal sets up a connection to a base station eNodeB; and a setup module, configured to set up a data channel between the eNodeB and the first forwarding entity, to connect the mobile terminal and the first forwarding entity, so that the first forwarding entity sends the packet to the mobile terminal by using the data channel and the connection.

With reference to the third aspect, in a first possible implementation manner of the foregoing third aspect, the paging module is configured to send a data notification message to a mobile network controller EPCC, where the data notification message carries the terminal address of the mobile terminal, so that the EPCC pages the mobile terminal according to the terminal address of the mobile terminal.

With reference to the third aspect, in a second possible implementation manner of the foregoing third aspect, the receiving module is further configured to receive a data channel setup request message sent by the EPCC, where the data channel setup request message carries an identifier of the eNodeB and a tunnel identifier on the eNodeB side.

With reference to the third aspect, in a third possible implementation manner of the foregoing third aspect, the setup module is configured to select, according to network topology, a forwarding entity that the data channel between the eNodeB and the first forwarding entity passes through; and configure a forwarding flow table on the selected forwarding entity according to a tunnel identifier on the eNodeB side, packet characteristic information, and a packet processing rule, so as to set up the data channel between the eNodeB and the first forwarding entity.

With reference to the third possible implementation manner of the third aspect, in a fourth possible implementation manner of the foregoing third aspect, the setup module is configured to: if the selected forwarding entity is the first forwarding entity, obtain a tunnel identifier on the first forwarding entity side; and create a forwarding flow table for the first forwarding entity, where the forwarding flow table includes the tunnel identifier on the eNodeB side, the tunnel identifier on the first forwarding entity side, the packet characteristic information, and the packet processing rule.

With reference to the fourth possible implementation manner of the third aspect, in a fifth possible implementation manner of the foregoing third aspect, the apparatus further includes:

a sending module, configured to send the forwarding flow table to the first forwarding entity, so that the first forwarding entity installs the forwarding flow table, to set up the data channel between the eNodeB and the first forwarding entity, where the data channel is a tunnel between the eNodeB and the first forwarding entity.

With reference to the third possible implementation manner of the third aspect, in a sixth possible implementation manner of the foregoing third aspect, the setup module is configured to: if the selected forwarding entity includes the first forwarding entity and a second forwarding entity directly connected to the eNodeB, obtain a tunnel identifier of a first tunnel on the second forwarding entity side, a tunnel identifier of a second tunnel on the second forwarding entity side, and a tunnel identifier of the first tunnel on the first forwarding entity side, where the first tunnel is a tunnel between the first forwarding entity and the second forwarding entity, and the second tunnel is a tunnel between the eNodeB and the second forwarding entity; create a first forwarding flow table for the first forwarding entity, where the first forwarding flow table includes the tunnel identifier of the first tunnel on the first forwarding entity side, the tunnel identifier of the first tunnel on the second forwarding entity side, the packet characteristic information, and the packet processing rule; and create a second forwarding flow table for the second forwarding entity, where the second forwarding flow table includes the tunnel identifier on the eNodeB side, the tunnel identifier of the second tunnel on the second forwarding entity side, the packet characteristic information, and the packet processing rule.

With reference to the sixth possible implementation manner of the third aspect, in a seventh possible implementation manner of the foregoing third aspect, the apparatus further includes:

a sending module, configured to send the first forwarding flow table to the first forwarding entity, so that the first forwarding entity installs the first forwarding flow table; and send the second forwarding flow table to the second forwarding entity, so that the second forwarding entity installs the second forwarding flow table, to set up the data channel between the eNodeB and the first forwarding entity, where the data channel includes the first tunnel and the second tunnel.

With reference to the sixth possible implementation manner of the third aspect, in an eighth possible implementation manner of the foregoing third aspect, the setup module is further configured to: if the selected forwarding entity further includes a third forwarding entity between the first forwarding entity and the second forwarding entity, create a third forwarding flow table for the third forwarding entity, where the third forwarding flow table includes the tunnel identifier of the first tunnel on the first forwarding entity side, the tunnel identifier of the first tunnel on the second forwarding entity side, the packet characteristic information, and the packet processing rule.

With reference to the eighth possible implementation manner of the third aspect, in a ninth possible implementation manner of the foregoing third aspect, the apparatus further includes:

a sending module, configured to send the third forwarding flow table to the third forwarding entity, so that the third forwarding entity installs the third forwarding flow table.

With reference to the third aspect, in a tenth possible implementation manner of the foregoing third aspect, the setup module is further configured to store, into a user bearer information table, the terminal address of the mobile terminal, a bearer state, an identifier of the selected forwarding entity, and the forwarding flow table created for the selected forwarding entity, where the bearer state is an active state.

With reference to the third aspect, in an eleventh possible implementation manner of the foregoing third aspect, the receiving module is further configured to receive a release request message sent by an EPCC when the mobile terminal requests to enter the idle state, where the release request message carries a release indication and the terminal address of the mobile terminal.

With reference to the eleventh possible implementation manner of the third aspect, in a twelfth possible implementation manner of the foregoing third aspect, the apparatus further includes:

a deleting module, configured to delete, according to the release indication and the terminal address, a forwarding flow table corresponding to the mobile terminal on a forwarding entity that a data channel corresponding to the mobile terminal passes through, so that the mobile terminal enters the idle state.

With reference to the twelfth possible implementation manner of the third aspect, in a thirteenth possible implementation manner of the foregoing third aspect, the deleting module is configured to obtain, from a user bearer information table according to the terminal address of the mobile terminal, the forwarding entity that the data channel corresponding to the mobile terminal passes through and the forwarding flow table corresponding to the mobile terminal; determine, from the obtained forwarding flow table, a forwarding flow table corresponding to the obtained forwarding entity; and obtain an identifier of the determined forwarding flow table from the determined forwarding flow table.

With reference to the thirteenth possible implementation manner of the third aspect, in a fourteenth possible implementation manner of the foregoing third aspect, the apparatus further includes:

a sending module, configured to send a flow table update message to the obtained forwarding entity, where the flow table update message carries a delete instruction and the identifier of the forwarding flow table corresponding to the obtained forwarding entity, so that the forwarding entity deletes the forwarding flow table corresponding to the identifier.

With reference to the twelfth possible implementation manner of the third aspect, in a fifteenth possible implementation manner of the foregoing third aspect, the deleting module is further configured to obtain, from a user bearer information table according to the terminal address of the mobile terminal, a record corresponding to the mobile terminal; delete a forwarding flow table stored in the record; and set a bearer state in the record to the idle state.

According to a fourth aspect, a packet sending apparatus is provided, where the apparatus includes:

a searching module, configured to receive, by a forwarding entity, a packet that is sent by a PDN to a mobile terminal, and search a stored forwarding flow table according to packet characteristic information;

a sending module, configured to: if no forwarding flow table including the packet characteristic information is found, send a packet notification message to a software defined networking SDN controller, where the packet notification message carries at least a terminal address of the mobile terminal, so that the SDN controller connects a channel between the forwarding entity and the mobile terminal, where the channel includes a connection between the mobile terminal and an eNodeB, and a data channel between the forwarding entity and the eNodeB; and a receiving module, configured to receive a forwarding flow table sent by the SDN controller, where the forwarding flow table includes at least the packet characteristic information, a packet processing rule, and a tunnel identifier of a tunnel included by the data channel, where the sending module is further configured to send the packet to the mobile terminal according to the forwarding flow table and by using the channel.

With reference to the fourth aspect, in a first possible implementation manner of the foregoing fourth aspect, the receiving module is further configured to receive, by the forwarding entity, a flow table update message sent by the SDN controller, where the flow table update message carries a delete instruction and an identifier of a forwarding flow table corresponding to the mobile terminal.

With reference to the first possible implementation manner of the fourth aspect, in a second possible implementation manner of the foregoing fourth aspect, the apparatus further includes:

a deleting module, configured to delete the forwarding flow table corresponding to the identifier according to the delete instruction.

According to a fifth aspect, a packet sending apparatus is provided, where the apparatus includes:

a receiver, configured to receive a packet notification message sent by a first forwarding entity, where the first forwarding entity is a forwarding entity that receives a packet that is sent by a public data network PDN to a mobile terminal, and the packet notification message carries at least a terminal address of the mobile terminal;

a transmitter, configured to: if the mobile terminal is in an idle state, page the mobile terminal according to the terminal address of the mobile terminal, so that the mobile terminal sets up a connection to a base station eNodeB; and a processor, configured to set up a data channel between the eNodeB and the first forwarding entity, to connect the mobile terminal and the first forwarding entity, so that the first forwarding entity sends the packet to the mobile terminal by using the data channel and the connection.

With reference to the fifth aspect, in a first possible implementation manner of the foregoing fifth aspect, the transmitter is configured to send a data notification message to a mobile network controller EPCC, where the data notification message carries the terminal address of the mobile terminal, so that the EPCC pages the mobile terminal according to the terminal address of the mobile terminal.

With reference to the fifth aspect, in a second possible implementation manner of the foregoing fifth aspect, the receiver is further configured to receive a data channel setup request message sent by the EPCC, where the data channel setup request message carries an identifier of the eNodeB and a tunnel identifier on the eNodeB side.

With reference to the fifth aspect, in a third possible implementation manner of the foregoing fifth aspect, the processor is configured to select, according to network topology, a forwarding entity that the data channel between the eNodeB and the first forwarding entity passes through; and configure a forwarding flow table on the selected forwarding entity according to a tunnel identifier on the eNodeB side, packet characteristic information, and a packet processing rule, so as to set up the data channel between the eNodeB and the first forwarding entity.

With reference to the third possible implementation manner of the fifth aspect, in a fourth possible implementation manner of the foregoing fifth aspect, the processor is configured to: if the selected forwarding entity is the first forwarding entity, obtain a tunnel identifier on the first forwarding entity side; and create a forwarding flow table for the first forwarding entity, where the forwarding flow table includes the tunnel identifier on the eNodeB side, the tunnel identifier on the first forwarding entity side, the packet characteristic information, and the packet processing rule.

With reference to the fourth possible implementation manner of the fifth aspect, in a fifth possible implementation manner of the foregoing fifth aspect, the transmitter is further configured to send the forwarding flow table to the first forwarding entity, so that the first forwarding entity installs the forwarding flow table, to set up the data channel between the eNodeB and the first forwarding entity, where the data channel is a tunnel between the eNodeB and the first forwarding entity.

With reference to the third possible implementation manner of the fifth aspect, in a sixth possible implementation manner of the foregoing fifth aspect, the processor is configured to: if the selected forwarding entity includes the first forwarding entity and a second forwarding entity directly connected to the eNodeB, obtain a tunnel identifier of a first tunnel on the second forwarding entity side, a tunnel identifier of a second tunnel on the second forwarding entity side, and a tunnel identifier of the first tunnel on the first forwarding entity side, where the first tunnel is a tunnel between the first forwarding entity and the second forwarding entity, and the second tunnel is a tunnel between the eNodeB and the second forwarding entity; create a first forwarding flow table for the first forwarding entity, where the first forwarding flow table includes the tunnel identifier of the first tunnel on the first forwarding entity side, the tunnel identifier of the first tunnel on the second forwarding entity side, the packet characteristic information, and the packet processing rule; and create a second forwarding flow table for the second forwarding entity, where the second forwarding flow table includes the tunnel identifier on the eNodeB side, the tunnel identifier of the second tunnel on the second forwarding entity side, the packet characteristic information, and the packet processing rule.

With reference to the sixth possible implementation manner of the fifth aspect, in a seventh possible implementation manner of the foregoing fifth aspect, the transmitter is further configured to send the first forwarding flow table to the first forwarding entity, so that the first forwarding entity installs the first forwarding flow table; and send the second forwarding flow table to the second forwarding entity, so that the second forwarding entity installs the second forwarding flow table, to set up the data channel between the eNodeB and the first forwarding entity, where the data channel includes the first tunnel and the second tunnel.

With reference to the sixth possible implementation manner of the fifth aspect, in an eighth possible implementation manner of the foregoing fifth aspect, the processor is further configured to: if the selected forwarding entity further includes a third forwarding entity between the first forwarding entity and the second forwarding entity, create a third forwarding flow table for the third forwarding entity, where the third forwarding flow table includes the tunnel identifier of the first tunnel on the first forwarding entity side, the tunnel identifier of the first tunnel on the second forwarding entity side, the packet characteristic information, and the packet processing rule.

With reference to the eighth possible implementation manner of the fifth aspect, in a ninth possible implementation manner of the foregoing fifth aspect, the transmitter is further configured to send the third forwarding flow table to the third forwarding entity, so that the third forwarding entity installs the third forwarding flow table.

With reference to the fifth aspect, in a tenth possible implementation manner of the foregoing fifth aspect, the processor is further configured to store, into a user bearer information table, the terminal address of the mobile terminal, a bearer state, an identifier of the selected forwarding entity, and the forwarding flow table created for the selected forwarding entity, where the bearer state is an active state.

With reference to the fifth aspect, in an eleventh possible implementation manner of the foregoing fifth aspect, the receiver is further configured to receive a release request message sent by an EPCC when the mobile terminal requests to enter the idle state, where the release request message carries a release indication and the terminal address of the mobile terminal.

With reference to the eleventh possible implementation manner of the fifth aspect, in a twelfth possible implementation manner of the foregoing fifth aspect, the processor is further configured to delete, according to the release indication and the terminal address, a forwarding flow table corresponding to the mobile terminal on a forwarding entity that a data channel corresponding to the mobile terminal passes through, so that the mobile terminal enters the idle state.

With reference to the twelfth possible implementation manner of the fifth aspect, in a thirteenth possible implementation manner of the foregoing fifth aspect, the processor is configured to obtain, from a user bearer information table according to the terminal address of the mobile terminal, the forwarding entity that the data channel corresponding to the mobile terminal passes through and the forwarding flow table corresponding to the mobile terminal; determine, from the obtained forwarding flow table, a forwarding flow table corresponding to the obtained forwarding entity; and obtain an identifier of the determined forwarding flow table from the determined forwarding flow table.

With reference to the thirteenth possible implementation manner of the fifth aspect, in a fourteenth possible implementation manner of the foregoing fifth aspect, the transmitter is further configured to send a flow table update message to the obtained forwarding entity, where the flow table update message carries a delete instruction and the identifier of the forwarding flow table corresponding to the obtained forwarding entity, so that the forwarding entity deletes the forwarding flow table corresponding to the identifier.

With reference to the twelfth possible implementation manner of the fifth aspect, in a fifteenth possible implementation manner of the foregoing fifth aspect, the processor is further configured to obtain, from a user bearer information table according to the terminal address of the mobile terminal, a record corresponding to the mobile terminal; delete a forwarding flow table stored in the record; and set a bearer state in the record to the idle state.

According to a sixth aspect, a packet sending apparatus is provided, where the apparatus includes:

a processor, configured to receive, by a forwarding entity, a packet that is sent by a PDN to a mobile terminal, and search a stored forwarding flow table according to packet characteristic information;

a transmitter, configured to: if no forwarding flow table including the packet characteristic information is found, send a packet notification message to a software defined networking SDN controller, where the packet notification message carries at least a terminal address of the mobile terminal, so that the SDN controller connects a channel between the forwarding entity and the mobile terminal, where the channel includes a connection between the mobile terminal and an eNodeB, and a data channel between the forwarding entity and the eNodeB; and a receiver, configured to receive a forwarding flow table sent by the SDN controller, where the forwarding flow table includes at least the packet characteristic information, a packet processing rule, and a tunnel identifier of a tunnel included by the data channel, where the transmitter is further configured to send the packet to the mobile terminal according to the forwarding flow table and by using the channel.

With reference to the sixth aspect, in a first possible implementation manner of the foregoing sixth aspect, the receiver is further configured to receive a flow table update message sent by the SDN controller, where the flow table update message carries a delete instruction and an identifier of a forwarding flow table corresponding to the mobile terminal.

With reference to the first possible implementation manner of the sixth aspect, in a second possible implementation manner of the foregoing sixth aspect, the processor is further configured to delete the forwarding flow table corresponding to the identifier according to the delete instruction.

In the embodiments of the present application, a packet notification message sent by a first forwarding entity is received, where the first forwarding entity is a forwarding entity that receives a packet that is sent by a public data network PDN to a mobile terminal, and the packet notification message carries at least a terminal address of the mobile terminal; if the mobile terminal is in an idle state, the mobile terminal is paged according to the terminal address of the mobile terminal, so that the mobile terminal sets up a connection to a base station eNodeB; and a data channel between the eNodeB and the first forwarding entity is set up, to connect the mobile terminal and the first forwarding entity, so that the first forwarding entity sends the packet to the mobile terminal by using the data channel and the connection. Because the mobile terminal is paged according to the terminal address of the mobile terminal and the data channel between the eNodeB and the first forwarding entity is set up, the mobile terminal in the idle state and the first forwarding entity are connected, to wake up the mobile terminal in the idle state and send the packet to the mobile terminal in the idle state.

BRIEF DESCRIPTION OF DRAWINGS

FIG. 2-1 is a schematic architecture diagram of a packet mobile network according to Embodiment 2 of the present application;

FIG. 2-2 is a flowchart of a packet sending method according to Embodiment 2 of the present application;

FIG. 2-3A and FIG. 2-3B are a flowchart of a packet sending method according to Embodiment 2 of the present application;

FIG. 3 is a flowchart of a packet sending method according to Embodiment 3 of the present application;

DESCRIPTION OF EMBODIMENTS

To make the objectives, technical solutions, and advantages of the present application clearer, the following further describes the embodiments of the present application in detail with reference to the accompanying drawings.

Embodiment 1

Figure 1:
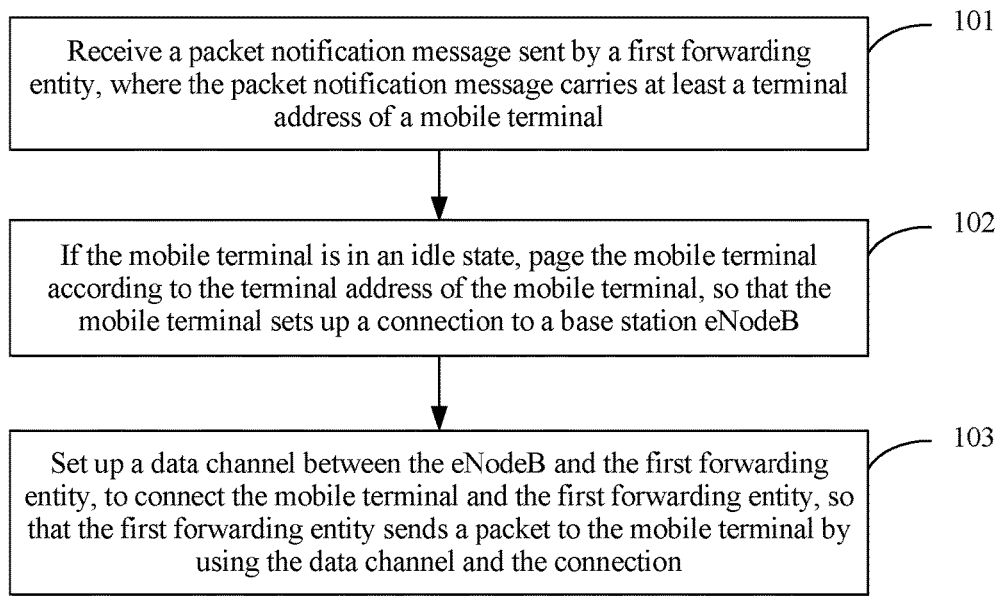
FIG. 1 is a flowchart of a packet sending method according to Embodiment 1 of the present application.

Referring to FIG. 1, this embodiment of the present application provides a packet sending method, including:

Step 101: Receive a packet notification message sent by a first forwarding entity, where the first forwarding entity is a forwarding entity that receives a packet that is sent by a public data network PDN to a mobile terminal, and the packet notification message carries at least a terminal address of the mobile terminal.

Step 102: If the mobile terminal is in an idle state, page the mobile terminal according to the terminal address of the mobile terminal, so that the mobile terminal sets up a connection to a base station eNodeB.

Step 103: Set up a data channel between the eNodeB and the first forwarding entity, to connect the mobile terminal and the first forwarding entity, so that the first forwarding entity sends the packet to the mobile terminal by using the data channel and the connection.

Preferably, the paging the mobile terminal according to the terminal address of the mobile terminal includes:

sending a data notification message to a mobile network controller EPCC, where the data notification message carries the terminal address of the mobile terminal, so that the EPCC pages the mobile terminal according to the terminal address of the mobile terminal.

Further, before the setting up a data channel between the eNodeB and the first forwarding entity, the method further includes:

receiving a data channel setup request message sent by an EPCC, where the data channel setup request message carries an identifier of the eNodeB and a tunnel identifier on an eNodeB side.

Preferably, the setting up a data channel between the eNodeB and the first forwarding entity includes:

selecting, according to network topology, a forwarding entity that the data channel between the eNodeB and the first forwarding entity passes through; and configuring a forwarding flow table on the selected forwarding entity according to a tunnel identifier on an eNodeB side, packet characteristic information, and a packet processing rule, so as to set up the data channel between the eNodeB and the first forwarding entity.

Preferably, the configuring a forwarding flow table on the selected forwarding entity according to a tunnel identifier on an eNodeB side, packet characteristic information, and a packet processing rule includes:

if the selected forwarding entity is the first forwarding entity, obtaining a tunnel identifier on a first forwarding entity side; and creating a forwarding flow table for the first forwarding entity, where the forwarding flow table includes the tunnel identifier on the eNodeB side, the tunnel identifier on the first forwarding entity side, the packet characteristic information, and the packet processing rule.

Further, after the creating a forwarding flow table for the first forwarding entity, the method further includes:

sending the forwarding flow table to the first forwarding entity, so that the first forwarding entity installs the forwarding flow table, to set up the data channel between the eNodeB and the first forwarding entity, where the data channel is a tunnel between the eNodeB and the first forwarding entity.

Preferably, the configuring a forwarding flow table on the selected forwarding entity according to a tunnel identifier on an eNodeB side, packet characteristic information, and a packet processing rule includes:

if the selected forwarding entity includes the first forwarding entity and a second forwarding entity directly connected to the eNodeB, obtaining a tunnel identifier of a first tunnel on a second forwarding entity side, a tunnel identifier of a second tunnel on the second forwarding entity side, and a tunnel identifier of the first tunnel on a first forwarding entity side, where the first tunnel is a tunnel between the first forwarding entity and the second forwarding entity, and the second tunnel is a tunnel between the eNodeB and the second forwarding entity;

creating a first forwarding flow table for the first forwarding entity, where the first forwarding flow table includes the tunnel identifier of the first tunnel on the first forwarding entity side, the tunnel identifier of the first tunnel on the second forwarding entity side, the packet characteristic information, and the packet processing rule; and creating a second forwarding flow table for the second forwarding entity, where the second forwarding flow table includes the tunnel identifier on the eNodeB side, the tunnel identifier of the second tunnel on the second forwarding entity side, the packet characteristic information, and the packet processing rule.

Further, after the creating a second forwarding flow table for the second forwarding entity, the method further includes:

sending the first forwarding flow table to the first forwarding entity, so that the first forwarding entity installs the first forwarding flow table; and sending the second forwarding flow table to the second forwarding entity, so that the second forwarding entity installs the second forwarding flow table, to set up the data channel between the eNodeB and the first forwarding entity, where the data channel includes the first tunnel and the second tunnel.

Further, the configuring a forwarding flow table on the selected forwarding entity according to a tunnel identifier on an eNodeB side, packet characteristic information, and a packet processing rule further includes:

if the selected forwarding entity further includes a third forwarding entity between the first forwarding entity and the second forwarding entity, creating a third forwarding flow table for the third forwarding entity, where the third forwarding flow table includes the tunnel identifier of the first tunnel on the first forwarding entity side, the tunnel identifier of the first tunnel on the second forwarding entity side, the packet characteristic information, and the packet processing rule.

Further, after the creating a third forwarding flow table for the third forwarding entity, the method further includes:

sending the third forwarding flow table to the third forwarding entity, so that the third forwarding entity installs the third forwarding flow table.

Further, after the configuring a forwarding flow table on the selected forwarding entity according to a tunnel identifier on an eNodeB side, packet characteristic information, and a packet processing rule, the method further includes:

storing, into a user bearer information table, the terminal address of the mobile terminal, a bearer state, an identifier of the selected forwarding entity, and the forwarding flow table created for the selected forwarding entity, where the bearer state is an active state.

Further, before the receiving a packet notification message sent by a first forwarding entity, the method further includes:

receiving a release request message sent by an EPCC when the mobile terminal requests to enter the idle state, where the release request message carries a release indication and the terminal address of the mobile terminal.

Further, after the receiving a release request message sent by an EPCC when the mobile terminal requests to enter the idle state, the method further includes:

deleting, according to the release indication and the terminal address, a forwarding flow table corresponding to the mobile terminal on a forwarding entity that a data channel corresponding to the mobile terminal passes through, so that the mobile terminal enters the idle state.

Preferably, the deleting, according to the release indication and the terminal address, a forwarding flow table corresponding to the mobile terminal on a forwarding entity that a data channel corresponding to the mobile terminal passes through includes:

obtaining, from a user bearer information table according to the terminal address of the mobile terminal, the forwarding entity that the data channel corresponding to the mobile terminal passes through and the forwarding flow table corresponding to the mobile terminal; and determining, from the obtained forwarding flow table, a forwarding flow table corresponding to the obtained forwarding entity, and obtaining an identifier of the determined forwarding flow table from the determined forwarding flow table.

Further, after the determining, from the obtained forwarding flow table, a forwarding flow table corresponding to the obtained forwarding entity, and obtaining an identifier of the determined forwarding flow table from the determined forwarding flow table, the method further includes:

sending a flow table update message to the obtained forwarding entity, where the flow table update message carries a delete instruction and the identifier of the forwarding flow table corresponding to the obtained forwarding entity, so that the forwarding entity deletes the forwarding flow table corresponding to the identifier.

Further, after the instructing, according to the terminal address carried in the release request message, the forwarding entity that the data channel corresponding to the mobile terminal passes through to delete the forwarding flow table corresponding to the mobile terminal, the method further includes:

obtaining, from a user bearer information table according to the terminal address of the mobile terminal, a record corresponding to the mobile terminal; and deleting a forwarding flow table stored in the record, and setting a bearer state in the record to the idle state.

In this embodiment of the present application, a packet notification message sent by a first forwarding entity is received, where the first forwarding entity is a forwarding entity that receives a packet that is sent by a public data network PDN to a mobile terminal, and the packet notification message carries at least a terminal address of the mobile terminal; if the mobile terminal is in an idle state, the mobile terminal is paged according to the terminal address of the mobile terminal, so that the mobile terminal sets up a connection to a base station eNodeB; and a data channel between the eNodeB and the first forwarding entity is set up, to connect the mobile terminal and the first forwarding entity, so that the first forwarding entity sends the packet to the mobile terminal by using the data channel and the connection. Because the mobile terminal is paged according to the terminal address of the mobile terminal and the data channel between the eNodeB and the first forwarding entity is set up, the mobile terminal in the idle state and the first forwarding entity are connected, to wake up the mobile terminal in the idle state and send the packet to the mobile terminal in the idle state.

Embodiment 2

This embodiment of the present application provides a packet sending method.

Figures 1, 2:
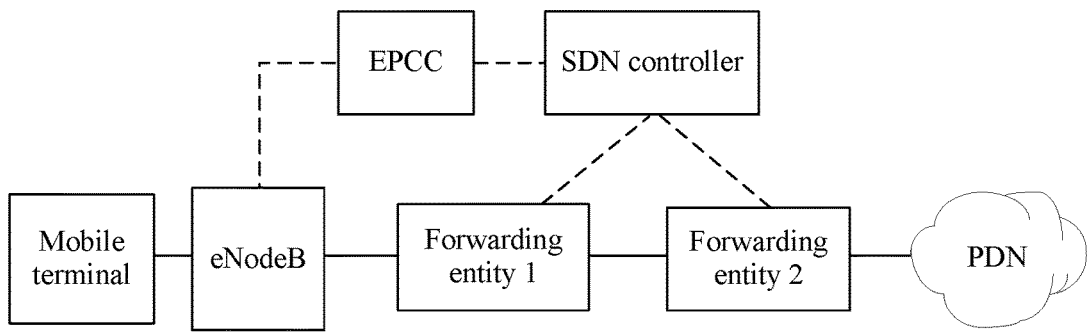
Figure 2:
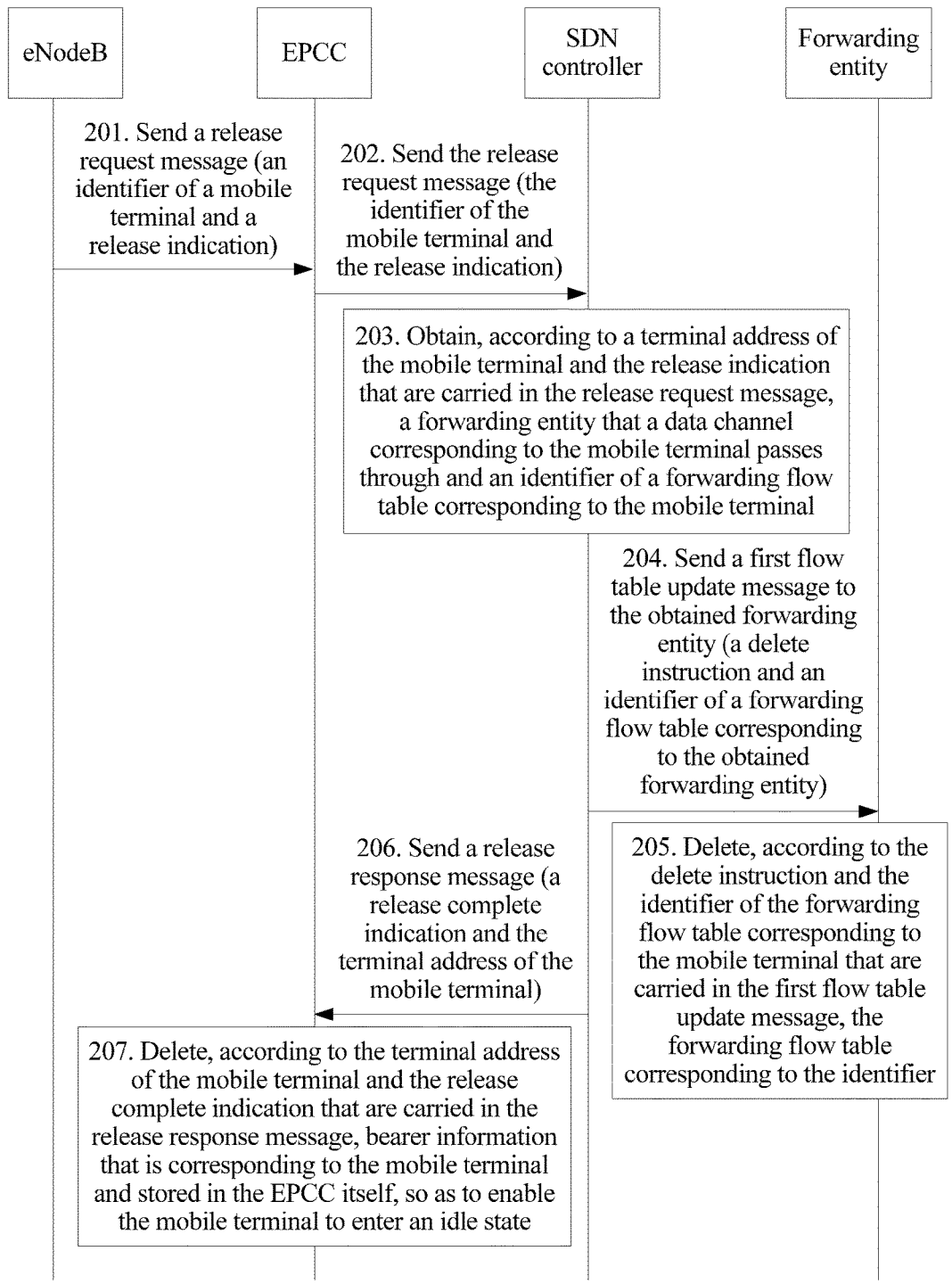

In the present application, the OF (OpenFlow) technology is applied to a mobile network, to form an OF-based packet mobile network in which control and forwarding are separated. As shown in FIG. 2-1, the packet mobile network includes an eNodeB, an EPCC (Evolved Packet Core Controller, mobile network controller), a forwarding entity, an SDN controller, and a PDN (public data network). The method provided in this embodiment of the present application includes a process of enabling a mobile terminal to enter an idle state in the packet mobile network, and a process of sending a packet to the mobile terminal in the idle state by using the packet mobile network.

Referring to FIG. 2-2, if the mobile terminal is idle, a radio link is faulty, or a base station is faulty, the following steps 201 to 207 may be performed to enable the mobile terminal to enter the idle state, including:

Step 201: The eNodeB sends a release request message to the EPCC, where the release request message carries an identifier of the mobile terminal and a release indication.

The release indication is used to indicate that the mobile terminal enters the idle state, and may be a release tunnel indication, an entering idle state indication, or the like.

When the eNodeB detects that a connection between the eNodeB and the mobile terminal is faulty, the eNodeB sends the release request message to the EPCC; or when the mobile terminal is idle, the mobile terminal sends a release request message to the eNodeB, and the eNodeB receives the release request message sent by the mobile terminal and sends the release request message to the EPCC.

Further, after sending the release request message to the EPCC, the eNodeB further deletes tunnel information, stored in the eNodeB itself, of a second tunnel corresponding to the mobile terminal, so as to release a wireless connection between the eNodeB and the mobile terminal.

The second tunnel is a tunnel between the eNodeB and a second forwarding entity; the second forwarding entity is a forwarding entity directly connected to the eNodeB; the tunnel information includes two tunnel identifiers of the second tunnel, an identifier of the eNodeB, and an identifier of the second forwarding entity. The two tunnel identifiers of the second tunnel include a tunnel identifier of the second tunnel on an eNodeB side and a tunnel identifier of the second tunnel on a second forwarding entity side.

The tunnel identifier on the eNodeB side is allocated by the eNodeB.

Step 202: The EPCC receives the release request message sent by the eNodeB, and sends the release request message to the SDN controller, where the release request message carries a terminal address of the mobile terminal and the release indication.

Step 203: The SDN controller receives the release request message sent by the EPCC, and obtains, according to the terminal address of the mobile terminal and the release indication that are carried in the release request message, a forwarding entity that a data channel corresponding to the mobile terminal passes through and an identifier of a forwarding flow table corresponding to the mobile terminal.

When the mobile terminal accesses the network, the SDN controller selects, according to network topology, the forwarding entity that the data channel corresponding to the mobile terminal passes through; creates a forwarding flow table for the forwarding entity that the data channel passes through; and stores, into a user bearer information table, the terminal address of the mobile terminal, a bearer state, an identifier of the forwarding entity that the data channel corresponding to the mobile terminal passes through, and the forwarding flow table created for the forwarding entity that the data channel passes through.

The bearer state may be an active state or an idle state. Because the mobile terminal needs to send or receive a packet when the mobile terminal accesses the network, in this case, the bearer state is the active state. The forwarding flow table includes at least an identifier of the forwarding flow table. The identifier of the forwarding flow table is an identifier that includes one or more fields and can uniquely identify the forwarding flow table.

This step is specifically as follows: The SDN controller receives the release request message sent by the EPCC; obtains, from the user bearer information table according to the terminal address of the mobile terminal and the release indication that are carried in the release request message, the forwarding entity that the data channel corresponding to the mobile terminal passes through and the forwarding flow table corresponding to the mobile terminal; and obtains the identifier of the forwarding flow table from the obtained forwarding flow table.

Further, after obtaining, according to the terminal address of the mobile terminal that is carried in the release request message, the forwarding entity that the data channel corresponding to the mobile terminal passes through and the forwarding flow table corresponding to the mobile terminal, the SDN controller further deletes the forwarding flow table that is corresponding to the terminal address and in the user bearer information table according to the release indication carried in the release request message, and sets the bearer state that is corresponding to the terminal address and in the user bearer information table to the idle state.

Step 204: The SDN controller sends a first flow table update message to the obtained forwarding entity, where the first flow table update message carries a delete instruction and an identifier of a forwarding flow table corresponding to the obtained forwarding entity.

Specifically, the SDN controller determines, from the obtained forwarding flow table corresponding to the mobile terminal, from the forwarding flow table corresponding to the mobile terminal, the forwarding flow table corresponding to the obtained forwarding entity, and sends the first flow table update message to the obtained forwarding entity, where the first flow table update message carries the delete instruction and the identifier of the forwarding flow table corresponding to the obtained forwarding entity.

Step 205: The forwarding entity receives the first flow table update message, and deletes, according to the delete instruction and the identifier of the forwarding flow table corresponding to the mobile terminal that are carried in the first flow table update message, the forwarding flow table corresponding to the identifier.

A flow table database is configured on the forwarding entity, where the flow table database stores one or more forwarding flow tables, and these forwarding flow tables are saved when the mobile terminal accesses the network.

This step is specifically as follows: The forwarding entity receives the first flow table update message; searches, according to the identifier that is of the forwarding flow table and carried in the first flow table update message, the flow table database configured on the forwarding entity itself for the forwarding flow table corresponding to the identifier; and deletes the found forwarding flow table according to the delete instruction carried in the first flow table update message.

After sending the first flow table update message to the determined forwarding entity, the SDN controller further sends a release response message to the EPCC by performing the following step 206.

Step 206: The SDN controller sends a release response message to the EPCC, where the release response message carries a release complete indication and the terminal address of the mobile terminal.

Step 207: The EPCC receives the release response message sent by the SDN controller, and deletes, according to the terminal address of the mobile terminal and the release complete indication that are carried in the release response message, bearer information that is corresponding to the mobile terminal and stored in the EPCC, so that the mobile terminal enters an idle state.

When the mobile terminal accesses the network, the EPCC obtains the identifier and the terminal address that are of the mobile terminal, the identifier of the eNodeB corresponding to the mobile terminal, and the tunnel identifier on the eNodeB side; obtains, from the SDN controller, all tunnels included by the data channel corresponding to the mobile terminal; and then obtains an identifier of a forwarding entity on an endpoint of the obtained tunnel. In addition, the EPCC further generates a tunnel identifier on a forwarding entity side on the endpoint of the obtained tunnel. The EPCC forms the bearer information of the mobile terminal by using the identifier of the eNodeB, the tunnel identifier on the eNodeB side, the identifier of the forwarding entity on the endpoint of the obtained tunnel, and the tunnel identifier on the forwarding entity side, and stores the identifier, the terminal address, and the bearer information that are of the mobile terminal into context information of the mobile terminal.

This step is specifically as follows: The EPCC receives the release response message sent by the SDN controller; obtains the context information of the mobile terminal according to the terminal address of the mobile terminal that is carried in the release response message; searches the stored context information of the mobile terminal for the corresponding bearer information; and deletes the identifier of the eNodeB, the tunnel identifier on the eNodeB side, and the identifier of the forwarding entity on the endpoint of the obtained tunnel that are included in the found bearer information.

After the EPCC deletes the bearer information corresponding to the mobile terminal, a connection between the mobile terminal, the eNodeB, and the EPCC is disconnected, and the mobile terminal enters the idle state.

For each of other mobile terminals if the mobile terminal is idle, the radio link is faulty, or the base station is faulty, same as the mobile terminal, the other mobile terminals are enabled, by performing the operations in the foregoing steps 201 to 207, to enter the idle state.

When receiving a packet that is sent by the PDN to the mobile terminal in the idle state, the forwarding entity may connect a channel between the mobile terminal and the forwarding entity by performing the following steps 208 to 222, so that the forwarding entity sends the packet to the mobile terminal by using the channel. Referring to FIG. 2-3A and FIG. 2-3B, for convenience, the forwarding entity is referred to as a first forwarding entity.

Step 208: The first forwarding entity receives a packet that is sent to the mobile terminal in the idle state, and searches a stored forwarding flow table according to packet characteristic information.

Specifically, the first forwarding entity receives the packet that is sent by the PDN to the mobile terminal in the idle state, and searches the stored forwarding flow table according to the terminal address of the mobile terminal that is included in the packet characteristic information. If no forwarding flow table including the terminal address of the mobile terminal is found, step 209 is performed.

Step 209: The first forwarding entity sends a packet notification message to the SDN controller, where the packet notification message carries at least the terminal address of the mobile terminal.

Specifically, the first forwarding entity obtains the packet characteristic information from the packet, obtains the terminal address of the mobile terminal from the packet characteristic information, and then sends the packet notification message to the SDN controller, where the packet notification message carries the obtained terminal address of the mobile terminal, or the packet notification message carries the packet.

Step 210: The SDN controller receives the packet notification message sent by the first forwarding entity, and determines, according to the terminal address of the mobile terminal that is carried in the packet notification message, that the mobile terminal is in the idle state.

Specifically, the SDN controller receives the packet notification message sent by the first forwarding entity; searches, according to the terminal address of the mobile terminal that is carried in the packet notification message, the stored user bearer information table for the bearer state corresponding to the terminal address of the mobile terminal; detects the bearer state; and if the bearer state is the idle state, determines that the mobile terminal is in the idle state.

After determining that the mobile terminal is in the idle state, the SDN controller needs to page the mobile terminal by performing the following steps 211 to 213.

Step 211: The SDN controller sends a data notification message to the EPCC, where the data notification message carries the terminal address of the mobile terminal.

Step 212: The EPCC receives the data notification message sent by the SDN controller, and sends a paging message to the eNodeB, where the paging message carries the identifier of the mobile terminal.

Specifically, the EPCC receives the data notification message sent by the SDN controller, obtains the context information of the mobile terminal according to the terminal address of the mobile terminal that is carried in the data notification message, obtains the identifier of the mobile terminal from the obtained context information of the mobile terminal, and then sends the paging message to the eNodeB, where the paging message carries the identifier of the mobile terminal.

Because a connection between the mobile terminal and the eNodeB is a wireless connection, the eNodeB needs to page the mobile terminal according to the identifier of the mobile terminal.

Step 213: The eNodeB receives the paging message sent by the EPCC, and sends, according to the identifier of the mobile terminal that is carried in the paging message, the paging message to the mobile terminal corresponding to the identifier.

After the eNodeB finds the mobile terminal by means of paging, the mobile terminal sets up a wireless connection to the eNodeB by performing the following step 215.

Step 214: The mobile terminal receives the paging message sent by the eNodeB, and sends a first service request message to the eNodeB, where the first service request message carries the identifier of the mobile terminal.

Step 215: The eNodeB receives the first service request message sent by the mobile terminal, and sends a second service request message to the EPCC, where the second service request message carries the identifier of the mobile terminal, the identifier of the eNodeB, and the tunnel identifier on the eNodeB side.

Further, after receiving the first service request message sent by the mobile terminal, the eNodeB further stores the identifier of the mobile terminal that is carried in the first service request message.

Step 216: The EPCC receives the second service request message sent by the eNodeB, and sends a data channel setup request message to the SDN controller, where the data channel setup request message carries the identifier of the eNodeB, the tunnel identifier on the eNodeB side, and a tunnel identifier list.

When the mobile terminal accesses the network, the EPCC generates a tunnel identifier list corresponding to the mobile terminal, where the tunnel identifier list includes a tunnel identifier of a second tunnel on a second forwarding entity side, a tunnel identifier of a first tunnel on the second forwarding entity side, and a tunnel identifier of the first tunnel on a first forwarding entity side.

The first tunnel is a tunnel between the first forwarding entity and the second forwarding entity.

The EPCC receives the second service request message sent by the eNodeB; obtains the context information of the mobile terminal according to the identifier of the mobile terminal that is carried in the second service request message; and stores, into the context information, the identifier of the eNodeB and the tunnel identifier on the eNodeB side that are carried in the second service request message.

Step 217: The SDN controller receives the data channel setup request message sent by the EPCC, and selects, according to network topology, a forwarding entity that the data channel corresponding to the mobile terminal passes through.

Step 218: If the selected forwarding entity includes the first forwarding entity and a second forwarding entity, the SDN controller separately configures a forwarding flow table on the first forwarding entity and the second forwarding entity, where the second forwarding entity is a forwarding entity directly connected to the eNodeB.

The SDN controller may configure the forwarding flow table on the first forwarding entity by performing the following steps (A-1) to (A-4), and details are as follows:

(A-1): The SDN controller obtains, from the tunnel identifier list carried in the data channel setup request message, the tunnel identifier of the first tunnel on the first forwarding entity side, where the first tunnel is the tunnel between the first forwarding entity and the second forwarding entity.

(A-2): The SDN controller creates a first forwarding flow table for the first forwarding entity, where the first forwarding flow table includes the tunnel identifier of the first tunnel on the first forwarding entity side, the tunnel identifier of the first tunnel on the second forwarding entity side, the packet characteristic information, and a packet processing rule.

(A-3): The SDN controller sends a second flow table update message to the first forwarding entity, where the second flow table update message carries an installation instruction and the first forwarding flow table.

(A-4): The first forwarding entity receives the second flow table update message sent by the SDN controller, and installs the first forwarding flow table according to the installation instruction carried in the second flow table update message.

The SDN controller configures the forwarding flow table on the second forwarding entity by performing the following steps (B-1) to (B-4), and details are as follows:

(B-1): The SDN controller obtains, from the tunnel identifier list carried in the data channel setup request message, the tunnel identifier of the first tunnel on the second forwarding entity side and the tunnel identifier of the second tunnel on the second forwarding entity side, where the second tunnel is a tunnel between the eNodeB and the second forwarding entity.

(B-2): The SDN controller creates a second forwarding flow table for the second forwarding entity, where the second forwarding flow table includes the tunnel identifier on the eNodeB side, the tunnel identifier of the second tunnel on the second forwarding entity side, the packet characteristic information, and the packet processing rule.

(B-3): The SDN controller sends a third flow table update message to the second forwarding entity, where the third flow table update message carries an installation instruction and the second forwarding flow table.

(B-4): The second forwarding entity receives the third flow table update message sent by the SDN controller, and installs the second forwarding flow table according to the installation instruction carried in the third flow table update message.

Further, if the selected forwarding entity further includes a third forwarding entity, the SDN controller further needs to configure a forwarding flow table on the third forwarding entity, where the third forwarding entity is a forwarding entity between the first forwarding entity and the second forwarding entity. The SDN controller may configure the forwarding flow table on the third forwarding entity by performing the following steps (C-1) to (C-3), and details are as follows:

(C-1): The SDN controller creates a third forwarding flow table for the third forwarding entity, where the third forwarding flow table includes the tunnel identifier of the first tunnel on the first forwarding entity side, the tunnel identifier of the first tunnel on the second forwarding entity side, the packet characteristic information, and the packet processing rule.

(C-2): The SDN controller sends a fourth flow table update message to the third forwarding entity, where the fourth flow table update message carries an installation instruction and the third forwarding flow table.

(C-3): The third forwarding entity receives the fourth flow table update message sent by the SDN controller, and installs the third forwarding flow table according to the installation instruction carried in the fourth flow table update message.

After the SDN controller configures the forwarding flow table on the first forwarding entity and the second forwarding entity, a data channel between the eNodeB and the first forwarding entity is set up, where the data channel includes the first tunnel between the first forwarding entity and the second forwarding entity, and the second tunnel between the eNodeB and the second forwarding entity.

Further, after setting up the data channel between the eNodeB and the first forwarding entity, the SDN controller obtains, from the user bearer information table according to the terminal address of the mobile terminal, a record corresponding to the mobile terminal, and changes the bearer state included in the record to the active state. If the forwarding entity that the data channel passes through includes the first forwarding entity and the second forwarding entity, the first forwarding flow table, the second forwarding flow table, an identifier of the first forwarding entity, and an identifier of the second forwarding entity are stored into the record corresponding to the mobile terminal. If the forwarding entity that the data channel passes through includes the first forwarding entity, the second forwarding entity, and the third forwarding entity, the first forwarding flow table, the second forwarding flow table, the third forwarding flow table, the identifier of the first forwarding entity, the identifier of the second forwarding entity, and an identifier of the third forwarding entity are stored into the record corresponding to the mobile terminal.

Step 219: The SDN controller sends a data channel setup response message to the EPCC, where the data channel setup response message carries the terminal address of the mobile terminal, an identifier of the first forwarding entity, and an identifier of the second forwarding entity.

Step 220: The EPCC receives the data channel setup response message sent by the SDN controller, and stores the identifier of the first forwarding entity and the identifier of the second forwarding entity that are carried in the data channel setup response message.

Specifically, the EPCC receives the data channel setup response message sent by the SDN controller; obtains, from the context information of the mobile terminal according to the terminal address carried in the data channel setup response message, the bearer information corresponding to the mobile terminal; and stores, into the bearer information corresponding to the mobile terminal, the identifier of the first forwarding entity and the identifier of the second forwarding entity that are carried in the data channel setup response information.

After receiving the data channel setup response message sent by the SDN controller, the EPCC further sends, by performing the following steps 221 and 222, the identifier of the second forwarding entity and the tunnel identifier of the second tunnel on the second forwarding entity side that are carried in the data channel setup response message to the eNodeB, so that the eNodeB stores the identifier of the second forwarding entity and the tunnel identifier of the second tunnel on the second forwarding entity side.

Step 221: The EPCC sends a service response message to the eNodeB, where the service response message carries the identifier of the second forwarding entity and the tunnel identifier of the second tunnel on the second forwarding entity side.

Step 222: The eNodeB receives the service response message sent by the EPCC, and stores the identifier of the second forwarding entity and the tunnel identifier of the second tunnel on the second forwarding entity side that are carried in the service response message.

The eNodeB receives the service response message sent by the EPCC, and stores a correspondence between the stored identifier of the mobile terminal and each of the identifier of the second forwarding entity and the tunnel identifier of the second tunnel on the second forwarding entity side that are carried in the service response message.

So far, the second tunnel between the eNodeB and the second forwarding entity, and the first tunnel between the second forwarding entity and the first forwarding entity are set up. The second tunnel and the first tunnel form the data channel between the eNodeB and the first forwarding entity, and the wireless connection between the mobile terminal and the eNodeB is set up, so that a channel between the mobile terminal and the first forwarding entity is connected, and the first forwarding entity can send the packet to the mobile terminal by using the channel.

The forwarding entity may be an OVS (open virtual switch), or the like.

In this embodiment of the present application, when a mobile terminal is idle, a radio link is faulty, or a base station is faulty, an SDN controller deletes a forwarding flow table corresponding to the mobile terminal on a forwarding entity that a data channel corresponding to the mobile terminal passes through, so as to disconnect the data channel corresponding to the mobile terminal, and enable the mobile terminal to enter an idle state. When a first forwarding entity receives a packet that is sent to the mobile terminal in the idle state, the SDN controller receives a packet notification message sent by the first forwarding entity, where the packet notification message carries at least a terminal address of the mobile terminal; pages the mobile terminal according to the terminal address of the mobile terminal, so that the mobile terminal sets up a connection to a base station eNodeB; sets up a data channel between the eNodeB and the first forwarding entity, so as to connect the mobile terminal and the first forwarding entity, and enable the first forwarding entity to send the packet to the mobile terminal by using the data channel and the connection, to wake up the mobile terminal in the idle state and send the packet to the mobile terminal.

Embodiment 3

This embodiment of the present application provides a packet sending method.

In the present application, the OF (OpenFlow) technology is applied to a mobile network, to form an OF-based packet mobile network in which control and forwarding are separated. As shown in FIG. 2-1, a core part of the packet mobile network includes an EPCC, a forwarding entity, and an SDN controller. The method provided in this embodiment of the present application includes a process of enabling a mobile terminal to enter an idle state in the packet mobile network, and a process of sending a packet to the mobile terminal in the idle state by using the packet mobile network.

Figures 2, 3, 3A:
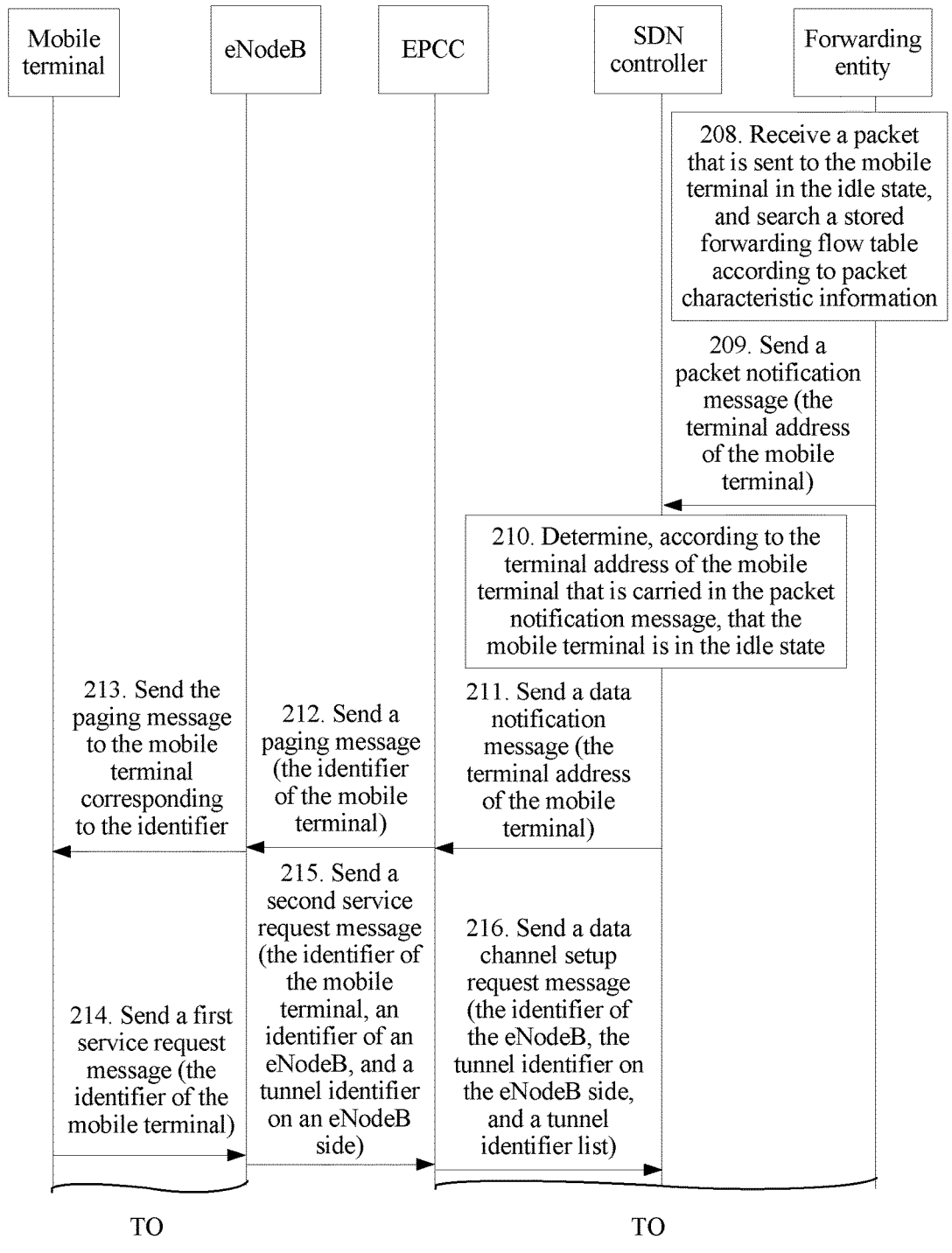
Figure 3:
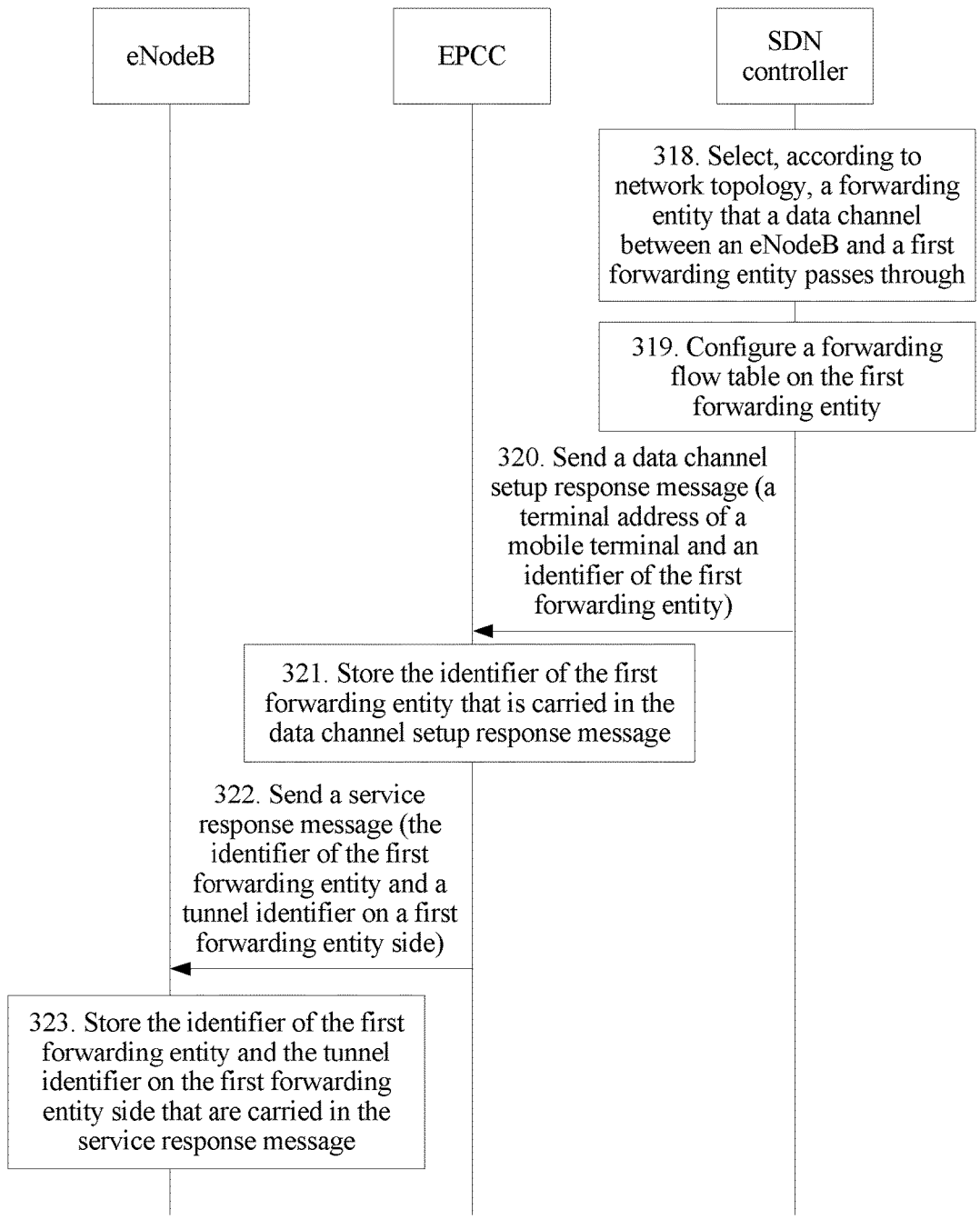

Referring to FIG. 3, the method includes the following steps:

Steps 301-317 are the same as steps 201-217 in Embodiment 2, and details are not described herein.

Step 318: The SDN controller receives a data channel setup request message sent by the EPCC, and selects, according to network topology, a forwarding entity that a data channel between the eNodeB and the first forwarding entity passes through.

In this embodiment of the present application, because the packet mobile network includes one forwarding entity, the forwarding entity that the data channel between the eNodeB and the first forwarding entity passes through is the first forwarding entity.

Step 319: The SDN controller configures a forwarding flow table on the first forwarding entity.

The SDN controller may configure the forwarding flow table on the first forwarding entity by performing the following steps (D-1) to (D-4), and details are as follows:

(D-1): The SDN controller selects a tunnel identifier on a first forwarding entity side from the tunnel identifier list carried in the data channel setup request message.

(D-2): The SDN controller creates the forwarding flow table for the first forwarding entity, where the forwarding flow table includes the tunnel identifier on the first forwarding entity side, the tunnel identifier on the eNodeB side, the packet characteristic information, and a packet processing rule.

(D-3): The SDN controller sends a flow table update message to the first forwarding entity, where the flow table update message carries an installation instruction and the created forwarding flow table.

(D-4): The first forwarding entity receives the flow table update message sent by the SDN controller, and installs the forwarding flow table according to the installation instruction carried in the flow table update message.

After the SDN controller configures the forwarding flow table on the first forwarding entity, the data channel between the eNodeB and the first forwarding entity is set up, where the data channel is a channel between the eNodeB and the first forwarding entity.

Further, after setting up the data channel between the eNodeB and the first forwarding entity, the SDN controller obtains, from a user bearer information table according to the terminal address of the mobile terminal, a record corresponding to the mobile terminal; and changes a bearer state included in the record to an active state; and stores, into the record corresponding to the mobile terminal, an identifier of the first forwarding entity and the forwarding flow table created for the first forwarding entity.

Step 320: The SDN controller sends a data channel setup response message to the EPCC, where the data channel setup response message carries the terminal address of the mobile terminal and an identifier of the first forwarding entity.

Step 321: The EPCC receives the data channel setup response message sent by the SDN controller, and stores the identifier of the first forwarding entity that is carried in the data channel setup response message.

Specifically, the EPCC receives the data channel setup response message sent by the SDN controller; obtains, from context information of the mobile terminal according to the terminal address carried in the data channel setup response message, bearer information corresponding to the mobile terminal; and stores, into the bearer information corresponding to the mobile terminal, the identifier of the first forwarding entity that is carried in the data channel setup response information.

After receiving the data channel setup response message sent by the SDN controller, the EPCC further sends, by performing the following steps 322 and 323, the identifier of the first forwarding entity and the tunnel identifier on the first forwarding entity side that are carried in the data channel setup response message to the eNodeB, so that the eNodeB stores the identifier of the first forwarding entity and the tunnel identifier on the first forwarding entity side.

Step 322: The EPCC sends a service response message to the eNodeB, where the service response message carries the identifier of the first forwarding entity and a tunnel identifier on a first forwarding entity side.

Step 323: The eNodeB receives the service response message sent by the EPCC, and stores the identifier of the first forwarding entity and the tunnel identifier on the first forwarding entity side that are carried in the service response message.

The eNodeB receives the service response message sent by the EPCC, and stores a correspondence between the stored identifier of the mobile terminal and each of the identifier of the first forwarding entity and the tunnel identifier on the first forwarding entity side that are carried in the service response message.

So far, the data channel between the eNodeB and the first forwarding entity is set up, and a wireless connection between the mobile terminal and the eNodeB is set up, so that a channel between the mobile terminal and the first forwarding entity is connected, and the first forwarding entity can send the packet to the mobile terminal by using the channel.

In this embodiment of the present application, when a mobile terminal is idle, a radio link is faulty, or a base station is faulty, an SDN controller deletes a forwarding flow table corresponding to the mobile terminal on a forwarding entity that a data channel corresponding to the mobile terminal passes through, so as to disconnect the data channel corresponding to the mobile terminal, and enable the mobile terminal to enter an idle state. When a first forwarding entity receives a packet that is sent to the mobile terminal in the idle state, the SDN controller receives a packet notification message sent by the first forwarding entity, where the packet notification message carries at least a terminal address of the mobile terminal; pages the mobile terminal according to the terminal address of the mobile terminal, so that the mobile terminal sets up a connection to a base station eNodeB; sets up a data channel between the eNodeB and the first forwarding entity, so as to connect the mobile terminal and the first forwarding entity, and enable the first forwarding entity to send the packet to the mobile terminal by using the data channel and the connection, to wake up the mobile terminal in the idle state and send the packet to the mobile terminal.

Embodiment 4

Figure 4:
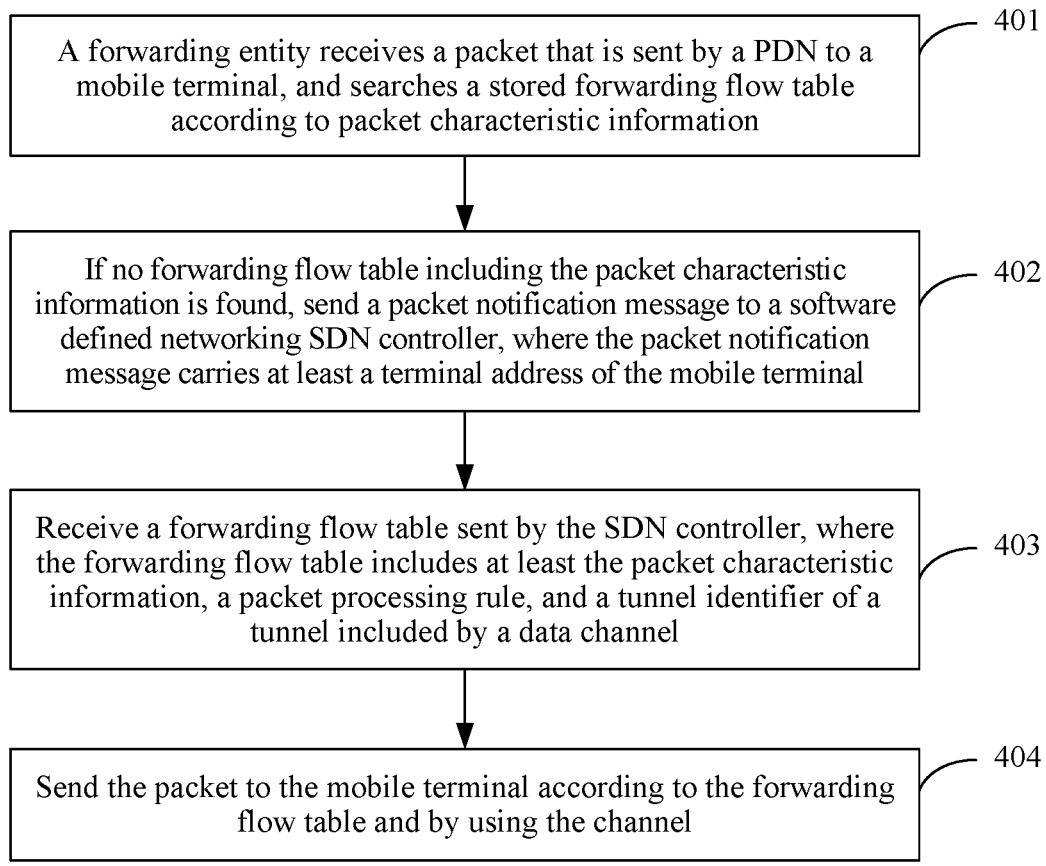
FIG. 4 is a flowchart of a packet sending method according to Embodiment 4 of the present application.

Referring to FIG. 4, this embodiment of the present application provides a packet sending method, including:

Step 401: A forwarding entity receives a packet that is sent by a PDN to a mobile terminal, and searches a stored forwarding flow table according to packet characteristic information.

Step 402: If no forwarding flow table including the packet characteristic information is found, send a packet notification message to a software defined networking SDN controller, where the packet notification message carries at least a terminal address of the mobile terminal, so that the SDN controller connects a channel between the forwarding entity and the mobile terminal, where the channel includes a connection between the mobile terminal and an eNodeB, and a data channel between the forwarding entity and the eNodeB.

Step 403: Receive a forwarding flow table sent by the SDN controller, where the forwarding flow table includes at least the packet characteristic information, a packet processing rule, and a tunnel identifier of a tunnel included by the data channel.

Step 404: Send the packet to the mobile terminal according to the forwarding flow table and by using the channel.

Further, before that a forwarding entity receives a packet that is sent by a PDN to a mobile terminal, and searches a stored forwarding flow table according to packet characteristic information, the method further includes:

The forwarding entity receives a flow table update message sent by the SDN controller, where the flow table update message carries a delete instruction and an identifier of a forwarding flow table corresponding to the mobile terminal.

Further, after that the forwarding entity receives a flow table update message sent by the SDN controller, the method further includes:

deleting the forwarding flow table corresponding to the identifier according to the delete instruction.

In this embodiment of the present application, a forwarding entity receives a packet that is sent by a PDN to a mobile terminal, and searches a stored forwarding flow table according to packet characteristic information; if no forwarding flow table including the packet characteristic information is found, sends a packet notification message to a software defined networking SDN controller, where the packet notification message carries at least a terminal address of the mobile terminal, so that the SDN controller connects a channel between the forwarding entity and the mobile terminal, where the channel includes a connection between the mobile terminal and an eNodeB, and a data channel between the forwarding entity and the eNodeB; receives a forwarding flow table sent by the SDN controller, where the forwarding flow table includes at least the packet characteristic information, a packet processing rule, and a tunnel identifier of a tunnel included by the data channel; and sends the packet to the mobile terminal according to the forwarding flow table and by using the channel. When no forwarding flow table including the packet characteristic information is found, the packet notification message is sent to the software defined networking SDN controller, so that the SDN controller connects the channel between the forwarding entity and the mobile terminal, and the forwarding entity sends the packet to the mobile terminal by using the channel, to wake up the mobile terminal in an idle state and send the packet to the mobile terminal.

Embodiment 5

Figure 5:
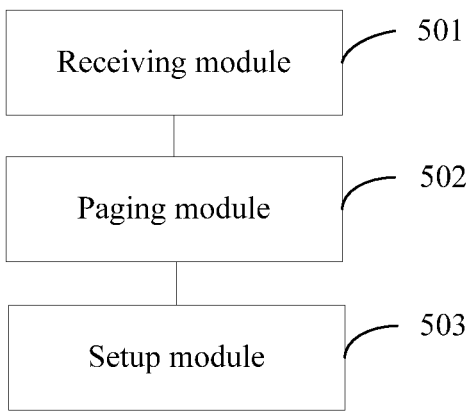
FIG. 5 is a schematic structural diagram of a packet sending apparatus according to Embodiment 5 of the present application.

Referring to FIG. 5, this embodiment of the present application provides a packet sending apparatus, including:

a receiving module 501, configured to receive a packet notification message sent by a first forwarding entity, where the first forwarding entity is a forwarding entity that receives a packet that is sent by a public data network PDN to a mobile terminal, and the packet notification message carries at least a terminal address of the mobile terminal;

a paging module 502, configured to: if the mobile terminal is in an idle state, page the mobile terminal according to the terminal address of the mobile terminal, so that the mobile terminal sets up a connection to a base station eNodeB; and a setup module 503, configured to set up a data channel between the eNodeB and the first forwarding entity, to connect the mobile terminal and the first forwarding entity, so that the first forwarding entity sends the packet to the mobile terminal by using the data channel and the connection.

When the forwarding entity receives the packet that is sent by the PDN to the mobile terminal in the idle state, for convenience, the forwarding entity is referred to as the first forwarding entity; the first forwarding entity receives the packet that is sent by the PDN to the mobile terminal in the idle state and searches a stored forwarding flow table according to the terminal address of the mobile terminal that is included in packet characteristic information. If no forwarding flow table including the terminal address of the mobile terminal is found, the first forwarding entity obtains the packet characteristic information from the packet, obtains the terminal address of the mobile terminal from the packet characteristic information, and then sends a packet notification message to an SDN controller, where the packet notification message carries the obtained terminal address of the mobile terminal, or the packet notification message carries the packet.

The receiving module 501 receives the packet notification message sent by the first forwarding entity; searches, according to the terminal address of the mobile terminal that is carried in the packet notification message, a stored user bearer information table for a bearer state corresponding to the terminal address of the mobile terminal; detects the bearer state; and if the bearer state is the idle state, determines that the mobile terminal is in the idle state.

The paging module 502 sends a data notification message to an EPCC, where the data notification message carries the terminal address of the mobile terminal. The EPCC receives the data notification message sent by the SDN controller, obtains context information of the mobile terminal according to the terminal address of the mobile terminal that is carried in the data notification message, obtains an identifier of the mobile terminal from the obtained context information of the mobile terminal, and sends a paging message to the eNodeB, where the paging message carries the identifier of the mobile terminal. The eNodeB receives the paging message sent by the EPCC, and sends, according to the identifier of the mobile terminal that is carried in the paging message, the paging message to the mobile terminal corresponding to the identifier.

The mobile terminal receives the paging message sent by the eNodeB, and sends a first service request message to the eNodeB, where the first service request message carries the identifier of the mobile terminal. The eNodeB receives the first service request message sent by the mobile terminal, and sends a second service request message to the EPCC, where the second service request message carries the identifier of the mobile terminal, an identifier of the eNodeB, and a tunnel identifier on an eNodeB side. The EPCC receives the second service request message sent by the eNodeB; obtains the context information of the mobile terminal according to the identifier of the mobile terminal that is carried in the second service request message; stores, into the context information, the identifier of the eNodeB and the tunnel identifier on the eNodeB side that are carried in the second service request message; and sends a data channel setup request message to the SDN controller, where the data channel setup request message carries the identifier of the eNodeB, the tunnel identifier on the eNodeB side, and a tunnel identifier list.

The setup module 503 receives the data channel setup request message sent by the EPCC and selects, according to network topology, a forwarding entity that a data channel corresponding to the mobile terminal passes through. If the selected forwarding entity includes the first forwarding entity and a second forwarding entity, the SDN controller separately configures a forwarding flow table on the first forwarding entity and the second forwarding entity, where the second forwarding entity is a forwarding entity directly connected to the eNodeB; and sends a data channel setup response message to the EPCC, where the data channel setup response message carries the terminal address of the mobile terminal, an identifier of the first forwarding entity, and an identifier of the second forwarding entity.

The EPCC receives the data channel setup response message sent by the SDN controller; obtains, from the context information of the mobile terminal according to the terminal address carried in the data channel setup response message, bearer information corresponding to the mobile terminal; and stores, into the bearer information corresponding to the mobile terminal, the identifier of the first forwarding entity and the identifier of the second forwarding entity that are carried in the data channel setup response information. The EPCC sends a service response message to the eNodeB, where the service response message carries the identifier of the second forwarding entity and a tunnel identifier of a second tunnel on a second forwarding entity side. The eNodeB receives the service response message sent by the EPCC, and stores the identifier of the second forwarding entity and the tunnel identifier of the second tunnel on the second forwarding entity side that are carried in the service response message.

So far, the second tunnel between the eNodeB and the second forwarding entity, and a first tunnel between the second forwarding entity and the first forwarding entity are set up. The second tunnel and the first tunnel form the data channel between the eNodeB and the first forwarding entity, and a wireless connection between the mobile terminal and the eNodeB is set up, so that a channel between the mobile terminal and the first forwarding entity is connected, and the first forwarding entity can send the packet to the mobile terminal by using the channel.

The paging module 502 is configured to send the data notification message to the mobile network controller EPCC, where the data notification message carries the terminal address of the mobile terminal, so that the EPCC pages the mobile terminal according to the terminal address of the mobile terminal.

Further, the receiving module 501 is further configured to receive the data channel setup request message sent by the EPCC, where the data channel setup request message carries the identifier of the eNodeB and the tunnel identifier on the eNodeB side.

The setup module 503 is configured to select, according to the network topology, a forwarding entity that the data channel between the eNodeB and the first forwarding entity passes through; and configure a forwarding flow table on the selected forwarding entity according to the tunnel identifier on the eNodeB side, the packet characteristic information, and a packet processing rule, to set up the data channel between the eNodeB and the first forwarding entity.

The setup module 503 is configured to: if the selected forwarding entity is the first forwarding entity, obtain a tunnel identifier on a first forwarding entity side; and create a forwarding flow table for the first forwarding entity, where the forwarding flow table includes the tunnel identifier on the eNodeB side, the tunnel identifier on the first forwarding entity side, the packet characteristic information, and the packet processing rule.

Further, the apparatus further includes:
a sending module, configured to send the forwarding flow table to the first forwarding entity, so that the first forwarding entity installs the forwarding flow table, to set up the data channel between the eNodeB and the first forwarding entity, where the data channel is a tunnel between the eNodeB and the first forwarding entity.

The setup module 503 is configured to: if the selected forwarding entity includes the first forwarding entity and the second forwarding entity directly connected to the eNodeB, obtain a tunnel identifier of a first tunnel on a second forwarding entity side, a tunnel identifier of a second tunnel on the second forwarding entity side, and a tunnel identifier of the first tunnel on a first forwarding entity side, where the first tunnel is a tunnel between the first forwarding entity and the second forwarding entity, and the second tunnel is a tunnel between the eNodeB and the second forwarding entity; create a first forwarding flow table for the first forwarding entity, where the first forwarding flow table includes the tunnel identifier of the first tunnel on the first forwarding entity side, the tunnel identifier of the first tunnel on the second forwarding entity side, the packet characteristic information, and the packet processing rule; and create a second forwarding flow table for the second forwarding entity, where the second forwarding flow table includes the tunnel identifier on the eNodeB side, the tunnel identifier of the second tunnel on the second forwarding entity side, the packet characteristic information, and the packet processing rule.

Further, the apparatus further includes:

a sending module, configured to send the first forwarding flow table to the first forwarding entity, so that the first forwarding entity installs the first forwarding flow table; and send the second forwarding flow table to the second forwarding entity, so that the second forwarding entity installs the second forwarding flow table, to set up the data channel between the eNodeB and the first forwarding entity, where the data channel includes the first tunnel and the second tunnel.

Further, the setup module 503 is further configured to: if the selected forwarding entity further includes a third forwarding entity between the first forwarding entity and the second forwarding entity, create a third forwarding flow table for the third forwarding entity, where the third forwarding flow table includes the tunnel identifier of the first tunnel on the first forwarding entity side, the tunnel identifier of the first tunnel on the second forwarding entity side, the packet characteristic information, and the packet processing rule.

Further, the apparatus further includes:

a sending module, configured to send the third forwarding flow table to the third forwarding entity, so that the third forwarding entity installs the third forwarding flow table.

Further, the setup module 503 is further configured to store, into a user bearer information table, the terminal address of the mobile terminal, a bearer state, an identifier of the selected forwarding entity, and the forwarding flow table created for the selected forwarding entity, where the bearer state is an active state.

Further, the receiving module 501 is further configured to receive a release request message sent by the EPCC when the mobile terminal requests to enter the idle state, where the release request message carries a release indication and the terminal address of the mobile terminal.

Further, the apparatus further includes:

a deleting module, configured to delete, according to the release indication and the terminal address, a forwarding flow table corresponding to the mobile terminal on a forwarding entity that a data channel corresponding to the mobile terminal passes through, so that the mobile terminal enters the idle state.

When the eNodeB detects that a connection between the eNodeB and the mobile terminal is faulty, the eNodeB sends a release request message to the EPCC; or when the mobile terminal is idle, the mobile terminal sends a release request message to the eNodeB, and the eNodeB receives the release request message sent by the mobile terminal and sends the release request message to the EPCC. The release request message carries the identifier of the mobile terminal and the release indication. The release indication is used to indicate that the mobile terminal enters the idle state, and may be a release tunnel indication, an entering idle state indication, or the like.

Further, after sending the release request message to the EPCC, the eNodeB further deletes tunnel information, stored in the eNodeB itself, of a second tunnel corresponding to the mobile terminal, so as to release a wireless connection between the eNodeB and the mobile terminal.

The EPCC receives the release request message sent by the eNodeB, and sends the release request message to the SDN controller, where the release request message carries the terminal address of the mobile terminal and the release indication.

The receiving module receives the release request message sent by the EPCC; obtains, from the user bearer information table according to the terminal address of the mobile terminal and the release indication that are carried in the release request message, the forwarding entity that the data channel corresponding to the mobile terminal passes through and the forwarding flow table corresponding to the mobile terminal; and obtains an identifier of the forwarding flow table from the obtained forwarding flow table.

Further, after the SDN controller obtains, according to the terminal address of the mobile terminal that is carried in the release request message, the forwarding entity that the data channel corresponding to the mobile terminal passes through and the forwarding flow table corresponding to the mobile terminal, the SDN controller further deletes, according to the release indication carried in the release request message, the forwarding flow table corresponding to the terminal address in the user bearer information table, and sets the bearer state corresponding to the terminal address in the user bearer information table to the idle state.

The deleting module determines, from the obtained forwarding flow table corresponding to the mobile terminal, from the forwarding flow table corresponding to the mobile terminal, a forwarding flow table corresponding to the obtained forwarding entity, and sends a first flow table update message to the obtained forwarding entity, where the first flow table update message carries a delete instruction and an identifier of the forwarding flow table corresponding to the obtained forwarding entity.

The forwarding entity receives the first flow table update message; searches, according to the identifier that is of the forwarding flow table and carried in the first flow table update message, a flow table database configured on the forwarding entity itself for the forwarding flow table corresponding to the identifier; and deletes the found forwarding flow table according to the delete instruction carried in the first flow table update message.

After sending the first flow table update message to the determined forwarding entity, the SDN controller further sends a release response message to the EPCC, where the release response message carries a release complete indication and the terminal address of the mobile terminal. The EPCC receives the release response message sent by the SDN controller; obtains the context information of the mobile terminal according to the terminal address of the mobile terminal that is carried in the release response message; searches the stored context information of the mobile terminal for the corresponding bearer information; and deletes the identifier of the eNodeB, the tunnel identifier on the eNodeB side, and an identifier of a forwarding entity on an endpoint of an obtained tunnel that are included in the found bearer information.

After the EPCC deletes the bearer information corresponding to the mobile terminal, a connection between the mobile terminal, the eNodeB, and the EPCC is disconnected, and the mobile terminal enters the idle state.

The deleting module is configured to obtain, from the user bearer information table according to the terminal address of the mobile terminal, the forwarding entity that the data channel corresponding to the mobile terminal passes through and the forwarding flow table corresponding to the mobile terminal; determine, from the obtained forwarding flow table, the forwarding flow table corresponding to the obtained forwarding entity; and obtain the identifier of the determined forwarding flow table from the determined forwarding flow table.

Further, the apparatus further includes:

a sending module, configured to send a flow table update message to the obtained forwarding entity, where the flow table update message carries a delete instruction and the identifier of the forwarding flow table corresponding to the obtained forwarding entity, so that the forwarding entity deletes the forwarding flow table corresponding to the identifier.

Further, the deleting module is further configured to obtain, from the user bearer information table according to the terminal address of the mobile terminal, a record corresponding to the mobile terminal; delete a forwarding flow table stored in the record; and set a bearer state in the record to the idle state.

In this embodiment of the present application, a packet notification message sent by a first forwarding entity is received, where the first forwarding entity is a forwarding entity that receives a packet that is sent by a public data network PDN to a mobile terminal, and the packet notification message carries at least a terminal address of the mobile terminal; if the mobile terminal is in an idle state, the mobile terminal is paged according to the terminal address of the mobile terminal, so that the mobile terminal sets up a connection to a base station eNodeB; and a data channel between the eNodeB and the first forwarding entity is set up, to connect the mobile terminal and the first forwarding entity, so that the first forwarding entity sends the packet to the mobile terminal by using the data channel and the connection. Because the mobile terminal is paged according to the terminal address of the mobile terminal and the data channel between the eNodeB and the first forwarding entity is set up, the mobile terminal in the idle state and the first forwarding entity are connected, to wake up the mobile terminal in the idle state and send the packet to the mobile terminal in the idle state.

Embodiment 6

Figure 6:
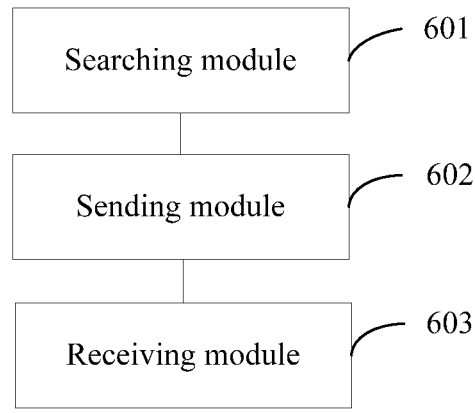
FIG. 6 is a schematic structural diagram of a packet sending apparatus according to Embodiment 6 of the present application.

Referring to FIG. 6, this embodiment of the present application provides a packet sending apparatus, including:

a searching module 601, configured to receive, by a forwarding entity, a packet that is sent by a PDN to a mobile terminal, and search a stored forwarding flow table according to packet characteristic information;

a sending module 602, configured to: if no forwarding flow table including the packet characteristic information is found, send a packet notification message to a software defined networking SDN controller, where the packet notification message carries at least a terminal address of the mobile terminal, so that the SDN controller connects a channel between the forwarding entity and the mobile terminal, where the channel includes a connection between the mobile terminal and an eNodeB, and a data channel between the forwarding entity and the eNodeB; and a receiving module 603, configured to receive a forwarding flow table sent by the SDN controller, where the forwarding flow table includes at least the packet characteristic information, a packet processing rule, and a tunnel identifier of a tunnel included by the data channel.

The sending module 602 is further configured to send the packet to the mobile terminal according to the forwarding flow table and by using the channel.

The searching module 601 receives the packet that is sent by the PDN to the mobile terminal in an idle state, and searches the stored forwarding flow table according to the terminal address of the mobile terminal that is included in the packet characteristic information.

If no forwarding flow table including the terminal address of the mobile terminal is found, the sending module 602 obtains the packet characteristic information from the packet, obtains the terminal address of the mobile terminal from the packet characteristic information, and then sends the packet notification message to the SDN controller, where the packet notification message carries the obtained terminal address of the mobile terminal, or the packet notification message carries the packet.

The receiving module 603 receives a flow table update message sent by the SDN controller, where the flow table update message carries an installation instruction and the forwarding flow table; and installs the forwarding flow table according to the installation instruction carried in the flow table update message.

After a data channel between the eNodeB and a first forwarding entity is set up, and a wireless connection between the mobile terminal and the eNodeB is set up, the sending module 602 may send the packet to the mobile terminal according to the forwarding flow table and by using the channel.

Further, the receiving module 603 is further configured to receive, by the forwarding entity, a flow table update message sent by the SDN controller, where the flow table update message carries a delete instruction and an identifier of a forwarding flow table corresponding to the mobile terminal.

Further, the apparatus further includes:

a deleting module, configured to delete the forwarding flow table corresponding to the identifier according to the delete instruction.

In this embodiment of the present application, a forwarding entity receives a packet that is sent by a PDN to a mobile terminal, and searches a stored forwarding flow table according to packet characteristic information; if no forwarding flow table including the packet characteristic information is found, sends a packet notification message to a software defined networking SDN controller, where the packet notification message carries at least a terminal address of the mobile terminal, so that the SDN controller connects a channel between the forwarding entity and the mobile terminal, where the channel includes a connection between the mobile terminal and an eNodeB, and a data channel between the forwarding entity and the eNodeB; receives a forwarding flow table sent by the SDN controller, where the forwarding flow table includes at least the packet characteristic information, a packet processing rule, and a tunnel identifier of a tunnel included by the data channel; and sends the packet to the mobile terminal according to the forwarding flow table and by using the channel. When no forwarding flow table including the packet characteristic information is found, the packet notification message is sent to the software defined networking SDN controller, so that the SDN controller connects the channel between the forwarding entity and the mobile terminal, and the forwarding entity sends the packet to the mobile terminal by using the channel, to wake up the mobile terminal in an idle state and send the packet to the mobile terminal.

Embodiment 7

Figure 7:
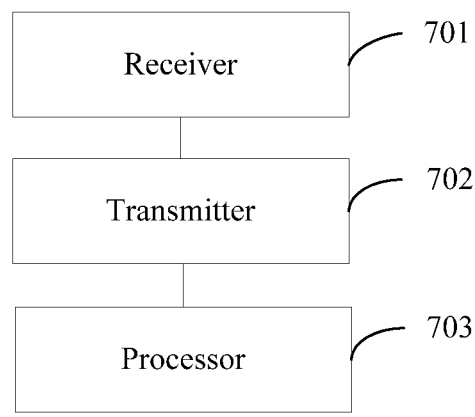
FIG. 7 is a schematic structural diagram of a packet sending apparatus according to Embodiment 7 of the present application.

Referring to FIG. 7, this embodiment of the present application provides a packet sending apparatus, including:

a receiver 701, configured to receive a packet notification message sent by a first forwarding entity, where the first forwarding entity is a forwarding entity that receives a packet that is sent by a public data network PDN to a mobile terminal, and the packet notification message carries at least a terminal address of the mobile terminal;

a transmitter 702, configured to: if the mobile terminal is in an idle state, page the mobile terminal according to the terminal address of the mobile terminal, so that the mobile terminal sets up a connection to a base station eNodeB; and a processor 703, configured to set up a data channel between the eNodeB and the first forwarding entity, to connect the mobile terminal and the first forwarding entity, so that the first forwarding entity sends the packet to the mobile terminal by using the data channel and the connection.

The transmitter 702 is configured to send a data notification message to a mobile network controller EPCC, where the data notification message carries the terminal address of the mobile terminal, so that the EPCC pages the mobile terminal according to the terminal address of the mobile terminal.

Further, the receiver 701 is further configured to receive a data channel setup request message sent by an EPCC, where the data channel setup request message carries an identifier of the eNodeB and a tunnel identifier on an eNodeB side.

The processor 703 is configured to select, according to network topology, a forwarding entity that the data channel between the eNodeB and the first forwarding entity passes through; and configure a forwarding flow table on the selected forwarding entity according to a tunnel identifier on an eNodeB side, packet characteristic information, and a packet processing rule, so as to set up the data channel between the eNodeB and the first forwarding entity.

The processor 703 is configured to: if the selected forwarding entity is the first forwarding entity, obtain a tunnel identifier on a first forwarding entity side; and create a forwarding flow table for the first forwarding entity, where the forwarding flow table includes the tunnel identifier on the eNodeB side, the tunnel identifier on the first forwarding entity side, the packet characteristic information, and the packet processing rule.

Further, the transmitter 702 is further configured to send the forwarding flow table to the first forwarding entity, so that the first forwarding entity installs the forwarding flow table, to set up the data channel between the eNodeB and the first forwarding entity, where the data channel is a tunnel between the eNodeB and the first forwarding entity.

The processor 703 is configured to: if the selected forwarding entity includes the first forwarding entity and a second forwarding entity directly connected to the eNodeB, obtain a tunnel identifier of a first tunnel on a second forwarding entity side, a tunnel identifier of a second tunnel on the second forwarding entity side, and a tunnel identifier of the first tunnel on a first forwarding entity side, where the first tunnel is a tunnel between the first forwarding entity and the second forwarding entity, and the second tunnel is a tunnel between the eNodeB and the second forwarding entity; create a first forwarding flow table for the first forwarding entity, where the first forwarding flow table includes the tunnel identifier of the first tunnel on the first forwarding entity side, the tunnel identifier of the first tunnel on the second forwarding entity side, the packet characteristic information, and the packet processing rule; and create a second forwarding flow table for the second forwarding entity, where the second forwarding flow table includes the tunnel identifier on the eNodeB side, the tunnel identifier of the second tunnel on the second forwarding entity side, the packet characteristic information, and the packet processing rule.

Further, the transmitter 702 is further configured to send the first forwarding flow table to the first forwarding entity, so that the first forwarding entity installs the first forwarding flow table; and send the second forwarding flow table to the second forwarding entity, so that the second forwarding entity installs the second forwarding flow table, to set up the data channel between the eNodeB and the first forwarding entity, where the data channel includes the first tunnel and the second tunnel.

Further, the processor 703 is further configured to: if the selected forwarding entity further includes a third forwarding entity between the first forwarding entity and the second forwarding entity, create a third forwarding flow table for the third forwarding entity, where the third forwarding flow table includes the tunnel identifier of the first tunnel on the first forwarding entity side, the tunnel identifier of the first tunnel on the second forwarding entity side, the packet characteristic information, and the packet processing rule.

Further, the transmitter 702 is further configured to send the third forwarding flow table to the third forwarding entity, so that the third forwarding entity installs the third forwarding flow table.

Further, the processor 703 is further configured to store, into a user bearer information table, the terminal address of the mobile terminal, a bearer state, an identifier of the selected forwarding entity, and the forwarding flow table created for the selected forwarding entity, where the bearer state is an active state.

Further, the receiver 701 is further configured to receive a release request message sent by an EPCC when the mobile terminal requests to enter the idle state, where the release request message carries a release indication and the terminal address of the mobile terminal.

Further, the processor 703 is further configured to delete, according to the release indication and the terminal address, a forwarding flow table corresponding to the mobile terminal on a forwarding entity that a data channel corresponding to the mobile terminal passes through, so that the mobile terminal enters the idle state.

The processor 703 is configured to obtain, from a user bearer information table according to the terminal address of the mobile terminal, the forwarding entity that the data channel corresponding to the mobile terminal passes through and the forwarding flow table corresponding to the mobile terminal; determine, from the obtained forwarding flow table, a forwarding flow table corresponding to the obtained forwarding entity; and obtain an identifier of the determined forwarding flow table from the determined forwarding flow table.

Further, the transmitter 702 is further configured to send a flow table update message to the obtained forwarding entity, where the flow table update message carries a delete instruction and the identifier of the forwarding flow table corresponding to the obtained forwarding entity, so that the forwarding entity deletes the forwarding flow table corresponding to the identifier.

Further, the processor 703 is further configured to obtain, from a user bearer information table according to the terminal address of the mobile terminal, a record corresponding to the mobile terminal; delete a forwarding flow table stored in the record; and set a bearer state in the record to the idle state.

In this embodiment of the present application, a packet notification message sent by a first forwarding entity is received, where the first forwarding entity is a forwarding entity that receives a packet that is sent by a public data network PDN to a mobile terminal, and the packet notification message carries at least a terminal address of the mobile terminal; if the mobile terminal is in an idle state, the mobile terminal is paged according to the terminal address of the mobile terminal, so that the mobile terminal sets up a connection to a base station eNodeB; and a data channel between the eNodeB and the first forwarding entity is set up, to connect the mobile terminal and the first forwarding entity, so that the first forwarding entity sends the packet to the mobile terminal by using the data channel and the connection. Because the mobile terminal is paged according to the terminal address of the mobile terminal and the data channel between the eNodeB and the first forwarding entity is set up, the mobile terminal in the idle state and the first forwarding entity are connected, to wake up the mobile terminal in the idle state and send the packet to the mobile terminal in the idle state.

Embodiment 8

Figure 8:
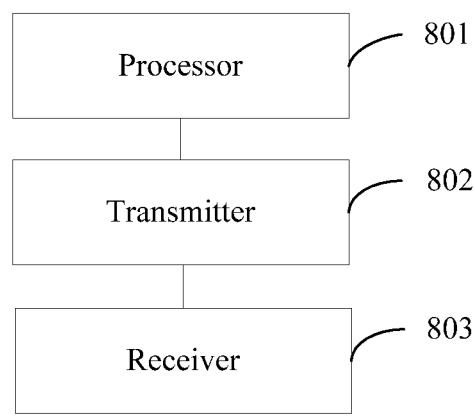
FIG. 8 is a schematic structural diagram of a packet sending apparatus according to Embodiment 8 of the present application.

Referring to FIG. 8, this embodiment of the present application provides a packet sending apparatus, including:

a processor 801, configured to receive, by a forwarding entity, a packet that is sent by a PDN to a mobile terminal, and search a stored forwarding flow table according to packet characteristic information;

a transmitter 802, configured to: if no forwarding flow table including the packet characteristic information is found, send a packet notification message to a software defined networking SDN controller, where the packet notification message carries at least a terminal address of the mobile terminal, so that the SDN controller connects a channel between the forwarding entity and the mobile terminal, where the channel includes a connection between the mobile terminal and an eNodeB, and a data channel between the forwarding entity and the eNodeB; and a receiver 803, configured to receive a forwarding flow table sent by the SDN controller, where the forwarding flow table includes at least the packet characteristic information, a packet processing rule, and a tunnel identifier of a tunnel included by the data channel.

The transmitter 802 is further configured to send the packet to the mobile terminal according to the forwarding flow table and by using the channel.

Further, the receiver 803 is further configured to receive a flow table update message sent by the SDN controller, where the flow table update message carries a delete instruction and an identifier of a forwarding flow table corresponding to the mobile terminal.

Further, the processor 801 is further configured to delete the forwarding flow table corresponding to the identifier according to the delete instruction.

In this embodiment of the present application, a forwarding entity receives a packet that is sent by a PDN to a mobile terminal, and searches a stored forwarding flow table according to packet characteristic information; if no forwarding flow table including the packet characteristic information is found, sends a packet notification message to a software defined networking SDN controller, where the packet notification message carries at least a terminal address of the mobile terminal, so that the SDN controller connects a channel between the forwarding entity and the mobile terminal, where the channel includes a connection between the mobile terminal and an eNodeB, and a data channel between the forwarding entity and the eNodeB; receives a forwarding flow table sent by the SDN controller, where the forwarding flow table includes at least the packet characteristic information, a packet processing rule, and a tunnel identifier of a tunnel included by the data channel; and sends the packet to the mobile terminal according to the forwarding flow table and by using the channel. When no forwarding flow table including the packet characteristic information is found, the packet notification message is sent to the software defined networking SDN controller, so that the SDN controller connects the channel between the forwarding entity and the mobile terminal, and the forwarding entity sends the packet to the mobile terminal by using the channel, to wake up the mobile terminal in an idle state and send the packet to the mobile terminal.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present application, but are not intended to limit the present application. Any modification, equivalent replacement, and improvement made without departing from the spirit and principle of the present application shall fall within the protection scope of the present application.

What is claimed is:

1. A packet sending method, wherein the method comprises:
   receiving a packet notification message sent by a first forwarding entity, wherein the first forwarding entity is a forwarding entity that receives a packet that is sent by a public data network (PDN) to a mobile terminal, and the packet notification message carries at least a terminal address of the mobile terminal;
   when the mobile terminal is in an idle state, paging the mobile terminal according to the terminal address of the mobile terminal, so that the mobile terminal sets up a connection to a base station (eNodeB); and
   setting up a data channel between the eNodeB and the first forwarding entity, to connect the mobile terminal and the first forwarding entity, so that the first forwarding entity sends the packet to the mobile terminal by using the data channel and the connection, the setting up a data channel comprising:
     selecting, according to network topology, a forwarding entity that the data channel between the eNodeB and the first forwarding entity passes through; and
     configuring a forwarding flow table on the selected forwarding entity according to a tunnel identifier on the eNodeB side, packet characteristic information, and a packet processing rule, so as to set up the data channel between the eNodeB and the first forwarding entity, wherein the configuring a forwarding flow table on the selected forwarding entity according to a tunnel identifier on the eNodeB side, packet characteristic information, and a packet processing rule comprising:
  when the selected forwarding entity comprises the first forwarding entity and a second forwarding entity directly connected to the eNodeB, obtaining a tunnel identifier of a first tunnel on the second forwarding entity side, a tunnel identifier of a second tunnel on the second forwarding entity side, and a tunnel identifier of the first tunnel on the first forwarding entity side, wherein the first tunnel is a tunnel between the first forwarding entity and the second forwarding entity, and the second tunnel is a tunnel between the eNodeB and the second forwarding entity;
  creating a first forwarding flow table for the first forwarding entity, wherein the first forwarding flow table comprises the tunnel identifier of the first tunnel on the first forwarding entity side, the tunnel identifier of the first tunnel on the second forwarding entity side, the packet characteristic information, and the packet processing rule; and
  creating a second forwarding flow table for the second forwarding entity, wherein the second forwarding flow table comprises the tunnel identifier on the eNodeB side, the tunnel identifier of the second tunnel on the second forwarding entity side, the packet characteristic information, and the packet processing rule.

2. The method according to claim 1, wherein the paging the mobile terminal according to the terminal address of the mobile terminal comprises:
  sending a data notification message to a mobile network controller, wherein the data notification message carries the terminal address of the mobile terminal, so that the mobile network controller pages the mobile terminal according to the terminal address of the mobile terminal.

3. The method according to claim 1, before the setting up a data channel between the eNodeB and the first forwarding entity, further comprising:
  receiving a data channel setup request message sent by a mobile network controller, wherein the data channel setup request message carries an identifier of the eNodeB and a tunnel identifier on the eNodeB side.

4. The method according to claim 1, wherein the configuring a forwarding flow table on the selected forwarding entity according to a tunnel identifier on the eNodeB side, packet characteristic information, and a packet processing rule comprises:
  if the selected forwarding entity is the first forwarding entity, obtaining a tunnel identifier on the first forwarding entity side; and
  creating a forwarding flow table for the first forwarding entity, wherein the forwarding flow table comprises the tunnel identifier on the eNodeB side, the tunnel identifier on the first forwarding entity side, the packet characteristic information, and the packet processing rule.

5. The method according to claim 4, after the creating a forwarding flow table for the first forwarding entity, further comprising:
  sending the forwarding flow table to the first forwarding entity, so that the first forwarding entity installs the forwarding flow table, to set up the data channel between the eNodeB and the first forwarding entity, wherein the data channel is a tunnel between the eNodeB and the first forwarding entity.

6. The method according to claim 1, after the creating a second forwarding flow table for the second forwarding entity, further comprising:
  sending the first forwarding flow table to the first forwarding entity, so that the first forwarding entity installs the first forwarding flow table; and sending the second forwarding flow table to the second forwarding entity, so that the second forwarding entity installs the second forwarding flow table, to set up the data channel between the eNodeB and the first forwarding entity, wherein the data channel comprises the first tunnel and the second tunnel.

7. The method according to claim 1, wherein the configuring a forwarding flow table on the selected forwarding entity according to a tunnel identifier on the eNodeB side, packet characteristic information, and a packet processing rule further comprises:
  if the selected forwarding entity further comprises a third forwarding entity between the first forwarding entity and the second forwarding entity, creating a third forwarding flow table for the third forwarding entity, wherein the third forwarding flow table comprises the tunnel identifier of the first tunnel on the first forwarding entity side, the tunnel identifier of the first tunnel on the second forwarding entity side, the packet characteristic information, and the packet processing rule.

8. The method according to claim 7, after the creating a third forwarding flow table for the third forwarding entity, further comprising:
  sending the third forwarding flow table to the third forwarding entity, so that the third forwarding entity installs the third forwarding flow table.

9. A packet sending apparatus, wherein the apparatus comprises:
  a receiver, configured to receive a packet notification message sent by a first forwarding entity, wherein the first forwarding entity is a forwarding entity that receives a packet that is sent by a public data network (PDN) to a mobile terminal, and the packet notification message carries at least a terminal address of the mobile terminal;
  a transmitter, configured to: if the mobile terminal is in an idle state, page the mobile terminal according to the terminal address of the mobile terminal, so that the mobile terminal sets up a connection to a base station (eNodeB); and
  a processor, configured to:
    set up a data channel between the eNodeB and the first forwarding entity, to connect the mobile terminal and the first forwarding entity, so that the first forwarding entity sends the packet to the mobile terminal by using the data channel and the connection,
    to select, according to network topology, a forwarding entity that the data channel between the eNodeB and the first forwarding entity passes through,
    configure a forwarding flow table on the selected forwarding entity according to a tunnel identifier on the eNodeB side, packet characteristic information, and a packet processing rule, so as to set up the data channel between the eNodeB and the first forwarding entity,
    when the selected forwarding entity comprises the first forwarding entity and a second forwarding entity directly connected to the eNodeB, obtain a tunnel identifier of a first tunnel on the second forwarding entity side, a tunnel identifier of a second tunnel on the second forwarding entity side, and a tunnel identifier of the first tunnel on the first forwarding entity side, wherein the first tunnel is a tunnel between the first forwarding entity and the second forwarding entity, and the second tunnel is a tunnel between the eNodeB and the second forwarding entity, create a first forwarding flow table for the first forwarding entity, wherein the first forwarding flow table comprises the tunnel identifier of the first tunnel on the first forwarding entity side, the tunnel identifier of the first tunnel on the second forwarding entity side, the packet characteristic information, and the packet processing rule, and create a second forwarding flow table for the second forwarding entity, wherein the second forwarding flow table comprises the tunnel identifier on the eNodeB side, the tunnel identifier of the second tunnel on the second forwarding entity side, the packet characteristic information, and the packet processing rule.

10. The apparatus according to claim 9, wherein the transmitter is configured to send a data notification message to a mobile network controller, wherein the data notification message carries the terminal address of the mobile terminal, so that the mobile network controller pages the mobile terminal according to the terminal address of the mobile terminal.

11. The apparatus according to claim 9, wherein the receiver is further configured to receive a data channel setup request message sent by a mobile network controller, wherein the data channel setup request message carries an identifier of the eNodeB and a tunnel identifier on the eNodeB side.

12. The apparatus according to claim 9, wherein the processor is configured to: if the selected forwarding entity is the first forwarding entity, obtain a tunnel identifier on the first forwarding entity side; and create a forwarding flow table for the first forwarding entity, wherein the forwarding flow table comprises the tunnel identifier on the eNodeB side, the tunnel identifier on the first forwarding entity side, the packet characteristic information, and the packet processing rule.

13. The apparatus according to claim 12, wherein the transmitter is further configured to send the forwarding flow table to the first forwarding entity, so that the first forwarding entity installs the forwarding flow table, to set up the data channel between the eNodeB and the first forwarding entity, wherein the data channel is a tunnel between the eNodeB and the first forwarding entity.

14. The apparatus according to claim 9, wherein the transmitter is further configured to send the first forwarding flow table to the first forwarding entity, so that the first forwarding entity installs the first forwarding flow table; and send the second forwarding flow table to the second forwarding entity, so that the second forwarding entity installs the second forwarding flow table, to set up the data channel between the eNodeB and the first forwarding entity, wherein the data channel comprises the first tunnel and the second tunnel.

15. The apparatus according to claim 9, wherein the processor is further configured to: if the selected forwarding entity further comprises a third forwarding entity between the first forwarding entity and the second forwarding entity, create a third forwarding flow table for the third forwarding entity, wherein the third forwarding flow table comprises the tunnel identifier of the first tunnel on the first forwarding entity side, the tunnel identifier of the first tunnel on the second forwarding entity side, the packet characteristic information, and the packet processing rule.

16. The apparatus according to claim 15, wherein the transmitter is further configured to send the third forwarding flow table to the third forwarding entity, so that the third forwarding entity installs the third forwarding flow table.

* * * * *

UNITED STATES PATENT AND TRADEMARK OFFICE
CERTIFICATE OF CORRECTION

PATENT NO. : 10,257,768 B2
APPLICATION NO. : 15/367971
DATED : April 9, 2019
INVENTOR(S) : Zhiwei Xiong et al.

Page 1 of 1

It is certified that error appears in the above-identified patent and that said Letters Patent is hereby corrected as shown below:

In the Claims

In Column 38, Line 67, In Claim 9, delete "forwardinq" and insert -- forwarding --, therefor.

Signed and Sealed this
Thirty-first Day of December, 2019

Andrei Iancu
*Director of the United States Patent and Trademark Office*